(12) United States Patent
Mino et al.

(10) Patent No.: US 10,554,440 B2
(45) Date of Patent: Feb. 4, 2020

(54) SENSOR DEVICE

(71) Applicant: OMRON Corporation, Kyoto (JP)

(72) Inventors: Hiroyuki Mino, Osaka (JP); Ryusuke Sakai, Kyoto (JP); Naotsugu Ueda, Shiga (JP); Kayo Nakamura, Shiga (JP); Yuhei Motoki, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/164,031

(22) Filed: Oct. 18, 2018

(65) Prior Publication Data
US 2019/0149355 A1  May 16, 2019

(30) Foreign Application Priority Data

Nov. 10, 2017  (JP) .................. 2017-217503

(51) Int. Cl.
*G08C 19/16* (2006.01)
*H04L 12/28* (2006.01)
*G08C 17/00* (2006.01)
*H04L 29/08* (2006.01)
*H04L 29/06* (2006.01)

(52) U.S. Cl.
CPC .......... *H04L 12/2836* (2013.01); *G08C 17/00* (2013.01); *H04L 29/06* (2013.01); *H04L 67/12* (2013.01); *H04L 67/2823* (2013.01)

(58) Field of Classification Search
CPC . H04L 12/2836; H04L 67/2823; H04L 67/12; H04L 29/06; G08C 17/00
USPC ..................................................... 340/870.01
See application file for complete search history.

(56) References Cited

U.S. PATENT DOCUMENTS

2014/0207721 A1* 7/2014 Filson ................. H04L 12/1895
706/46
2018/0033262 A1* 2/2018 Shah ........................ G08B 6/00

FOREIGN PATENT DOCUMENTS

JP    2016-162017 A   9/2016

* cited by examiner

*Primary Examiner* — Tanmay K Shah
(74) *Attorney, Agent, or Firm* — Osha Liang LLP

(57) ABSTRACT

A sensor device includes a data acquisition unit configured to acquire different types of measurement data from a plurality of sensors that measure the measurement data, an event determination unit configured to determine that an event occurs when the measurement data satisfies an event condition corresponding to the occurrence of the event, and a transmission controller configured to transmit transmission data in which the measurement data is stored in a predetermined data format. The transmission controller varies the data format of the transmission data in a case where the event does not occur and in a case where the event occurs.

19 Claims, 21 Drawing Sheets

SENSOR DEVICE

CROSS-REFERENCE TO RELATED APPLICATION

This application is based on Japanese Patent Application No. 2017-217503 filed with the Japan Patent Office on Nov. 10, 2017, the entire contents of which are incorporated herein by reference.

FIELD

The present invention relates to a sensor device that detects occurrence of an event.

BACKGROUND

Various sensors have been developed in order to detect physical quantities such as temperature, humidity, illuminance, ultraviolet light, and pressure. Particularly in recent years, it has been conceivable that, by disposing a sensor unit including various types of sensors, an environment such as workplaces and living space is detected in a multiplex manner, and multilateral information analysis and utilization are performed based on the detected information.

In the case where the sensor unit is disposed in the space of a measurement target, desirably the detected information can wirelessly be acquired. For example, in Japanese Unexamined Patent Application Publication No. 2016-162017, there is proposed a sensor device including a data processor that stores data measured by a measurement unit as sensor information in an advertise packet used in Bluetooth (registered trademark) and a communication unit that transmits the advertise packet by the wireless communication.

In a system of transmitting the measured data with the measured data stored in the advertise packet as in Japanese Unexamined Patent Application Publication No. 2016-162017, the data that can be transmitted is restricted because an amount of data that can be stored in the advertise packet is restricted. For this reason, even when an event such as an earthquake and a fire occurs to desire detailed data, the desired data cannot always be obtained.

SUMMARY

An aspect of the present invention has been made in view of such circumstances, and an object of the present invention is to provide a technique enabling the transmission of appropriate information in response to the occurrence of the event.

In order to solve the above problem, the present invention adopts the following configuration.

According to an aspect of the present invention, a sensor device includes: a data acquisition unit configured to acquire different types of measurement data from a plurality of sensors that measure the measurement data; an event determination unit configured to determine that an event occurs when the measurement data satisfies an event condition corresponding to the occurrence of the event; and a transmission controller configured to transmit transmission data in which the measurement data is stored in a predetermined data format in which the transmission controller varies the data format of the transmission data in a case where the event does not occur and in a case where the event occurs.

Consequently, in the sensor device, when the event occurs, the data format of the transmission data can be changed to transmit the appropriate measurement data during the occurrence of the event. The data format can be adopted according to the occurrence of the event, so that the transmission data can be transmitted without reducing the information amount such as omission of the data during the occurrence of the event.

In the sensor device, the transmission controller may transmit the transmission data with the transmission data stored in an identification signal for detecting the sensor device.

In the sensor device, when the event occurs, the transmission controller may transmit the transmission data in a data format including the measurement data of a type corresponding to the event.

In the sensor device, the transmission controller may transmit the transmission data in a first data format including the measurement data of a predetermined type when the event does not occur, and the transmission controller may transmit the transmission data in a second data format including the measurement data of a type different from the first data format and the transmission data in the first data format in a time division manner when the event occurs.

In the sensor device, the transmission controller may transmit the transmission data in a first data format including the measurement data of a predetermined type and the transmission data in a second data format including the measurement data of a type different from the first data format in a time division manner, and vary at least a transmission frequency of the transmission data in the second data format in the case where the event does not occur and in the case where the event occurs.

The sensor device may further include an operation setting unit configured to set a measurement frequency of each of the sensors when the event occurs higher than a measurement frequency when the event does not occur, in which the transmission data may be transmitted in a data format including a plurality of pieces of the measurement data measured at measurement timing set by the operation setting unit when the event occurs.

In the sensor device, when the event determination unit determines that an occurrence of a malfunction of the sensor device is the occurrence of the event, the transmission controller may transmit the transmission data in a data format including the measurement data and the transmission data in a data format including data indicating the malfunction in the time division manner.

In the sensor device, a plurality of types of measurement data measured by the plurality of sensors may be distributed to a predetermined number of data formats, and the pieces of transmission data in the predetermined number of data formats may be periodically transmitted.

The sensor device may further include a storage in which the measurement data measured by the sensor is stored, in which a plurality of pieces of measurement data measured at different timings may be read from the storage, and the transmission data in a data format including the plurality of pieces of measurement data may be transmitted.

The sensor device may further include: an operation setting unit configured to set a measurement frequency of the sensor when the event occurs higher than a measurement frequency when the event does not occur; and a storage in which the measurement data measured by the sensor is stored in which the data acquisition unit stores the measurement data in the storage when the event occurs, and when a transmission request is received from another device, the transmission controller may read the plurality of pieces of measurement data from the storage, and transmit the transmission data in a data format including the measurement data to the other device.

In the sensor device, the identification signal may be an advertise packet or a beacon packet used in Bluetooth (registered trademark). Specifically, the advertise packet is defined by a Bluetooth low energy (hereinafter, also referred to as BLE) standard.

The sensor device may further include a connection controller configured to establish connection to another device when the event occurs in which the transmission controller may transmit the transmission data with the transmission data stored in the identification signal when the event does not occur, and the transmission controller may transmit the transmission data to the other device through the connection established by the connection controller when the event occurs.

The means for solving the above problem can be used in combination as much as possible.

The present invention can provide a technique enabling the transmission of appropriate information in response to an occurrence of an event.

DETAILED DESCRIPTION

Hereinafter, an embodiment according to an aspect of the present invention will be described with reference to the drawings.

1. Application Example

Figure 1:
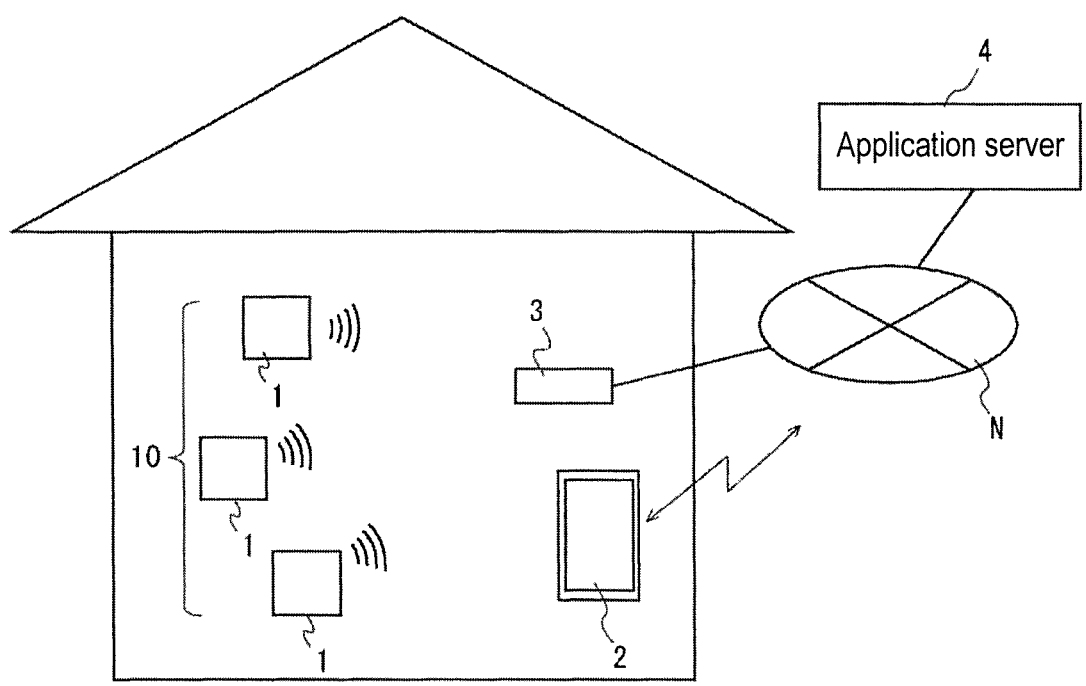
FIG. 1 is a view illustrating an installation example of a composite sensor unit according to an embodiment.

FIG. 1 is a diagram illustrating an installation example of a composite sensor unit 1 according to the embodiment. In the embodiment, a plurality of composite sensor units 1 are provided in a user's home as a measurement target, and the plurality of composite sensor units 1 constitute a sensor system 10. The sensor system 10 may include a user terminal 2 and a gateway 3. The composite sensor unit 1 transmits detected data to the user terminal 2 and the gateway 3. For example, in the case where the user terminal 2 exists in the user's home, the user terminal 2 directly receives data from the composite sensor unit 1 by short-range wireless communication. In the case where the user terminal 2 exists outside the user's home, the gateway 3 receives data from the composite sensor unit 1, and transmits the data to an application server 4 through a network N such as the Internet, and the application server 4 processes the received data, and transmits a processed result to the user terminal 2 through the network N. The application server 4 is not essential, and the gateway 3 may be connected to the user terminal 2 through the network N to transmit the data received from the composite sensor unit 1 to the user terminal 2. In the embodiment, the composite sensor unit 1 is in the form of a sensor device.

Figure 2:
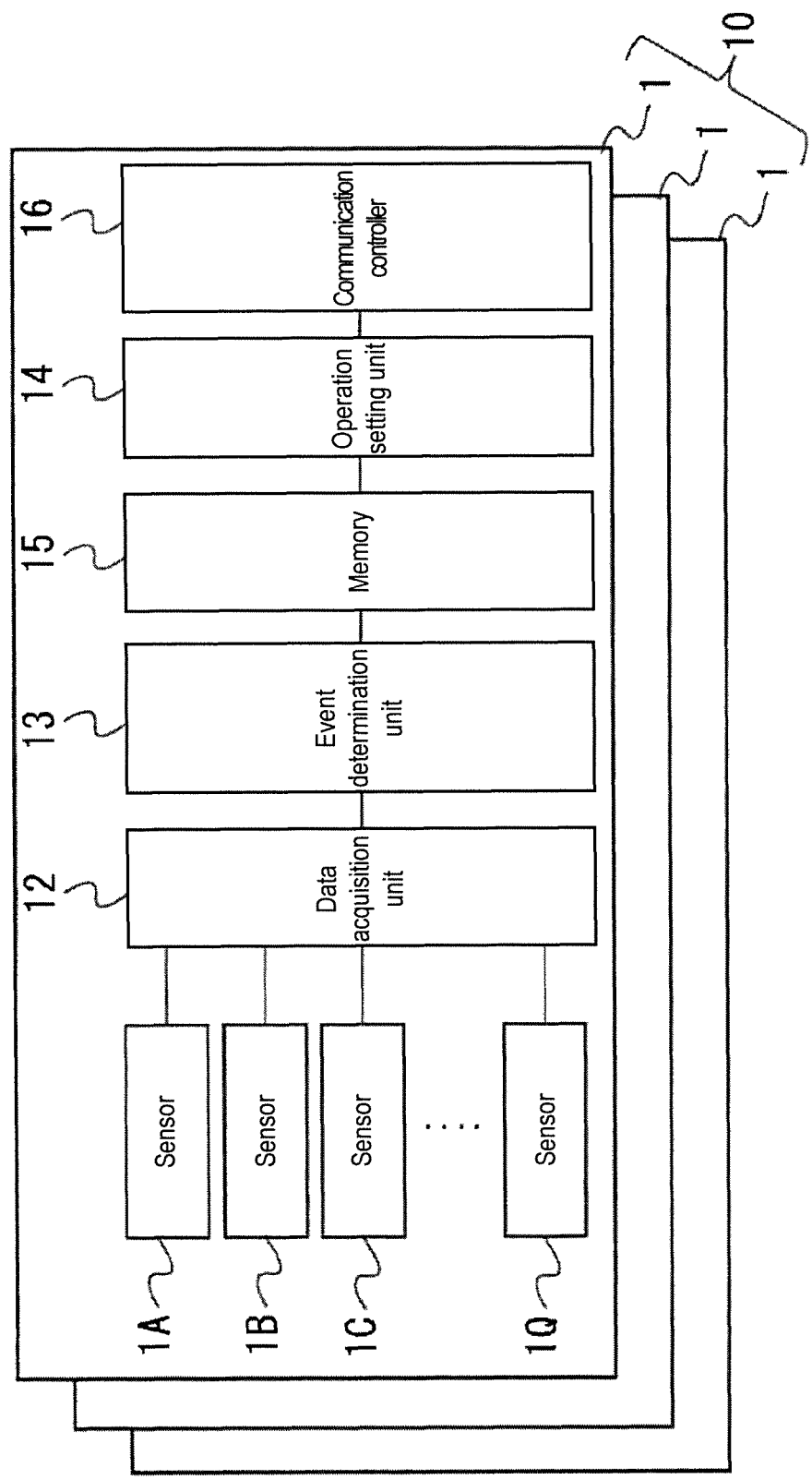
FIG. 2 is a block diagram illustrating a configuration of the composite sensor unit.

FIG. 2 is a block diagram illustrating a configuration of the composite sensor unit 1. The composite sensor unit 1 includes a plurality of sensors 1A to 1Q, a data acquisition unit 12, an event determination unit 13, an operation setting unit 14, a memory 15, and a communication controller 16 in one package.

Each of the plurality of sensors 1A to 1Q is a sensor that acquires measurement data by measuring different types of physical quantities for each measurement target, and the data acquisition unit 12 acquires the measurement data from each of the sensors 1A to 1Q.

When an output value of at least a part of the plurality of sensors 1A to 1Q satisfies an event condition corresponding to occurrence of a predetermined event, the event determination unit 13 determines that the predetermined event occurs. The event determination unit 13 determines the occurrence of a related event, which is an event that may occur in association with the occurrence of the predetermined event, based on the fact that the output value of the sensor including the sensor necessary for the determination of the occurrence of the related event among the plurality of sensors 1A to 1Q satisfies a related event condition corresponding to the occurrence of the related event.

The operation setting unit 14 sets operations of the plurality of sensors 1A to 1Q according to presence or absence of the occurrence of the event. For example, in the case where the event occurs, a measurement frequency of each of the sensors 1A to 1Q is set higher as compared to a case where the event does not occur.

Figure 3:
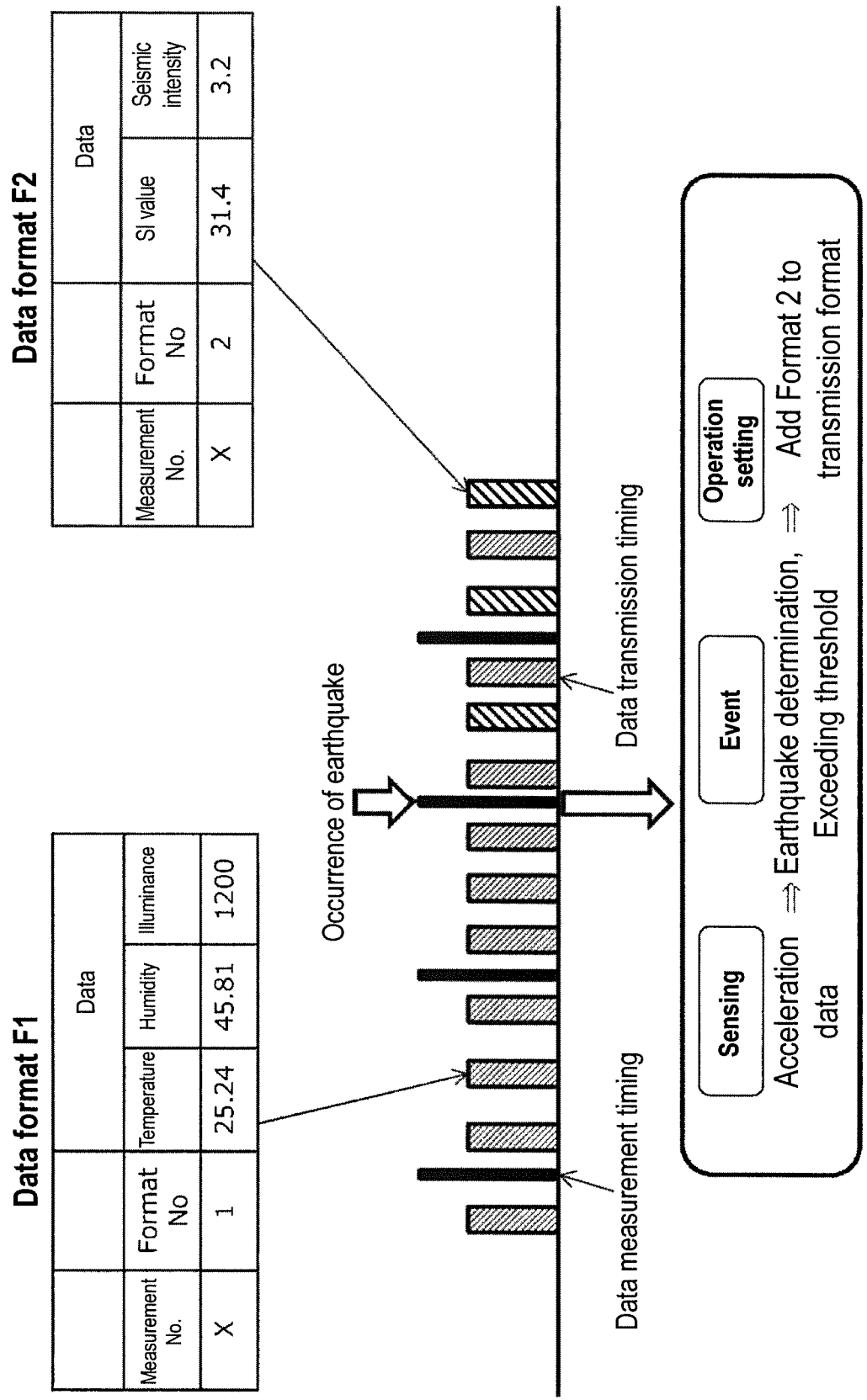
FIG. 3 is a diagram illustrating a data format of transmission data transmitted by a communication controller.

The communication controller 16 is an example of a transmission controller that transmits the data to other devices such as the user terminal 2, the gateway 3, and another composite sensor unit 1. The composite sensor unit 1 includes a communication module that conducts wireless communication according to a wireless communication standard such as Bluetooth (registered trademark) as described later, and the communication controller 16 communicates with other devices using the communication module. For example, the communication controller 16 transmits the transmission data in which the measurement data of each of the sensors 1A to 1Q is converted into a predetermined data format, with the transmission data stored in a Bluetooth advertise packet. The communication controller 16 may transmit the transmission data with the transmission data stored in a scan response packet corresponding to a scan request. Hereinafter, only the advertise packet will be described, but the transmission data may be transmitted by replacing the following advertise packet with the scan response packet. The communication controller 16 varies the data format of the transmission data in a case where the event does not occur and in a case where the event occurs. FIG. 3 is a diagram illustrating the data format of the transmission data transmitted by the communication controller 16. In the embodiment, for example, the data format of the transmission data defines the type of data included in the transmission data or transmission timing. In FIG. 3, a horizontal axis indicates time, a thick solid line orthogonal to the horizontal axis indicates measurement timing, and a shaded rectangle indicates the transmission timing of the transmission data. A difference in transmission data to be transmitted, namely, a difference in data format is indicated by a difference of each shaded rectangle.

As illustrated in FIG. 3, in the case where the event does not occur, the communication controller 16 transmits the transmission data in a first format F1. At this point, the first format F1 includes temperature, humidity, and illuminance. In the case where the event determination unit 13 determines that the event such as an earthquake occurs based on the measurement data of the sensors 1A to 1Q, the communication controller 16 alternately transmits the first format F1 and a second format F2. At this point, the second format F2 includes an SI value and seismic intensity.

As described above, in the embodiment, the composite sensor unit 1 transmits the transmission data with the transmission data stored in the Bluetooth advertise packet, which allows the user terminal 2 to receive the transmission data from each of the plurality of composite sensor units 1 even if the user terminal 2 is not connected to each composite sensor unit 1. In this case, an amount of measurement data that can be transmitted is restricted by use of the advertise packet. However, in the embodiment, the data format of the transmission data is changed when the event occurs, and the transmission data can be transmitted in the data format corresponding to the event. Consequently, for example, when the earthquake occurs, the transmission data including the SI value and the seismic intensity can be transmitted, and the appropriate transmission data corresponding to the event can be transmitted. As a result, the user can acquire necessary information when the event occurs.

2. Embodiments (2-1)

An embodiment (2-1) of the present invention will be described below with reference to FIGS. 3 to 8. The same element as that in the above application example is denoted by the same reference numeral, and the description thereof will be omitted.

Figure 4:
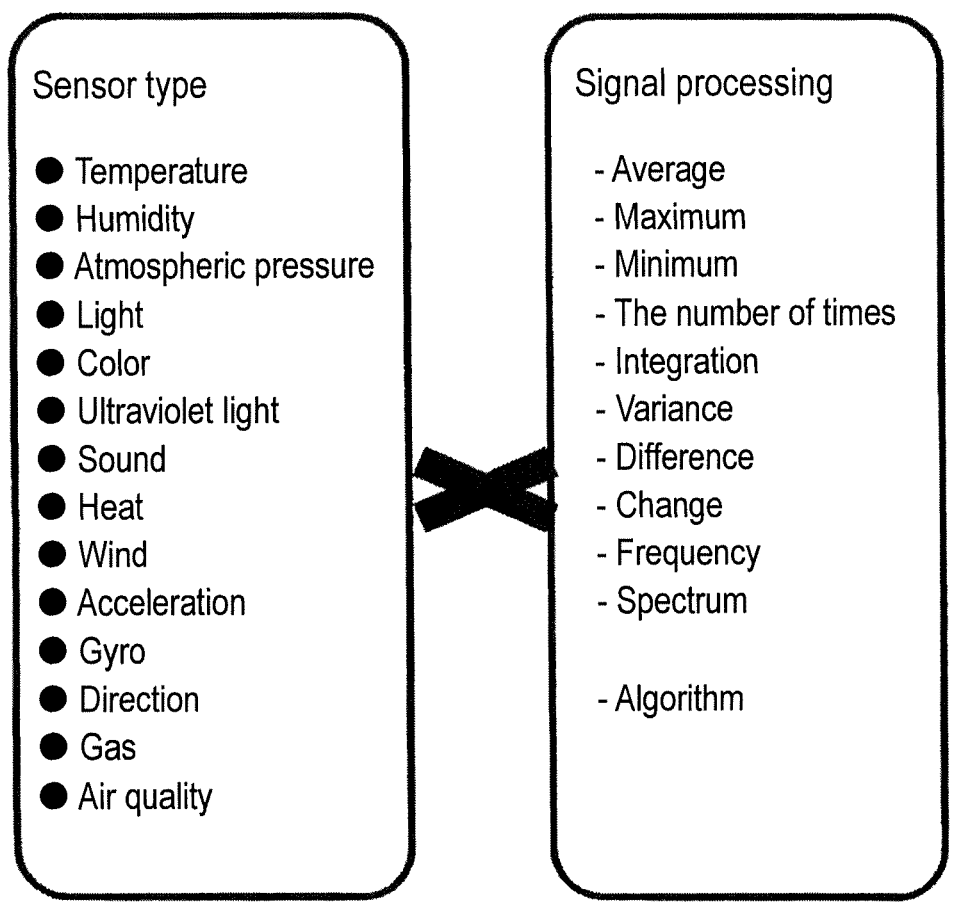
FIG. 4 is a diagram illustrating an example of a sensor type and signal processing of a data acquisition unit.

FIG. 4 is a diagram illustrating types of sensors 1A to 1Q and an example of signal processing of the data acquisition unit 12. As illustrated in FIG. 3, examples of the sensors 1A to 1Q include a temperature sensor, a humidity sensor, an absolute pressure sensor, a light sensor, a color sensor (RGB sensor), an ultraviolet sensor, a sound sensor (microphone), a heat sensor, a wind sensor (flow sensor), an acceleration sensor, a gyroscope (gyro sensor), a direction sensor, a gas sensor, an air quality sensor, a $CO_2$ sensor, a position sensor, a strain sensor, an infrared sensor, a magnetic sensor, and an illuminance sensor. The present invention is not limited to this configuration, and the sensors 1A to 1Q may be other sensors. Processing of obtaining an average value, a maximum value, a minimum value, the number of times, an integrated value, a variance, a difference, a rate of change, a frequency, and a spectrum with respect to output values measured and outputted in a predetermined period by these sensors 1A to 1Q can be cited as an example of signal processing when the data acquisition unit 12 acquires the data from the sensors 1A to 1Q. The data acquisition unit 12 may perform processing of calculating output values of the sensors 1A to 1Q with a predetermined algorithm to obtain a calculation result.

Figure 5:
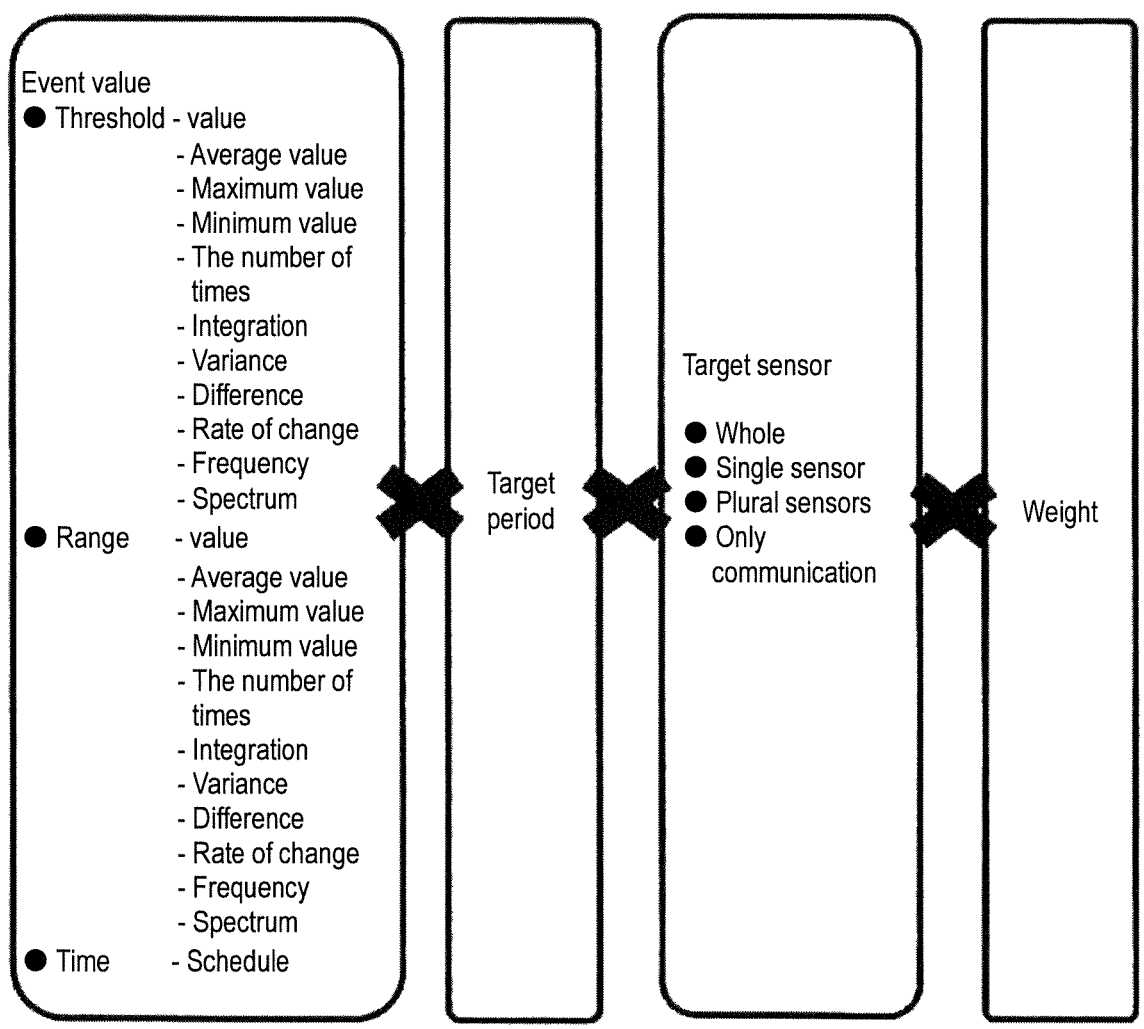
FIG. 5 is an explanatory diagram of an event condition.

FIG. 5 is an explanatory diagram of an event condition. The event determination unit 13 determines that the event condition is satisfied, namely, the event occurs in the case where the output value of the target sensor corresponds to the event value in a target period. A plurality of event conditions may be set, and in this case, each event condition may be weighted.

In FIG. 5, the event value is a threshold value, a range, and time (schedule) for determining the occurrence of the event. The threshold value is a value that specifies the output value itself of the sensor that determines that the event occurs, the average value, the maximum value, the minimum value, the number of output times, the integrated value, the variance, the difference, the rate of change, the frequency, and the spectrum. In the case where the output values of the target sensors 1A to 1Q exceed or fall below the threshold value, it is determined that the event occurs. Similarly, the range is a range that specifies the output value itself of the sensor that determines that the event occurs, the average value, the maximum value, the minimum value, the number of output times, the integrated value, the variance, the difference, the rate of change, the frequency, and the spectrum. In the case where the output values of the target sensors 1A to 1Q are within or out of the range, it is determined that the event occurs.

In the case where an event occurrence time (schedule) is set as the event value, it is determined that the event occurs at the event occurrence time regardless of the output values of the sensors 1A to 1Q.

The target period is a period, such as a predetermined cycle and a predetermined time, during which the output values of the sensors 1A to 1Q are acquired to determine the occurrence of the event, namely, a period during which the sensors 1A to 1Q perform the measurement.

The target sensor is a sensor that uses the output value to determine the occurrence of the event, namely, a sensor necessary for the determination of the occurrence of the event among the sensors 1A to 1Q. A single sensor or a plurality of sensors can be set as the target sensor. In the case where the plurality of sensors are set as the target sensor, whether it is determined that the event occurs when the output values of all the target sensors correspond to the event value, or whether it is determined that the event occurs when the output value of any one of the target sensors corresponds to the event value may be specified. The communication controller 16 may be used as one of the sensors, and designated as the target sensor, and the communication quality and the number of communication times may be used as the event value.

The weight is a coefficient specifying a priority of the plurality of event conditions. For example, the priority of the event can be enhanced with increasing weight coefficient.

Figure 6:
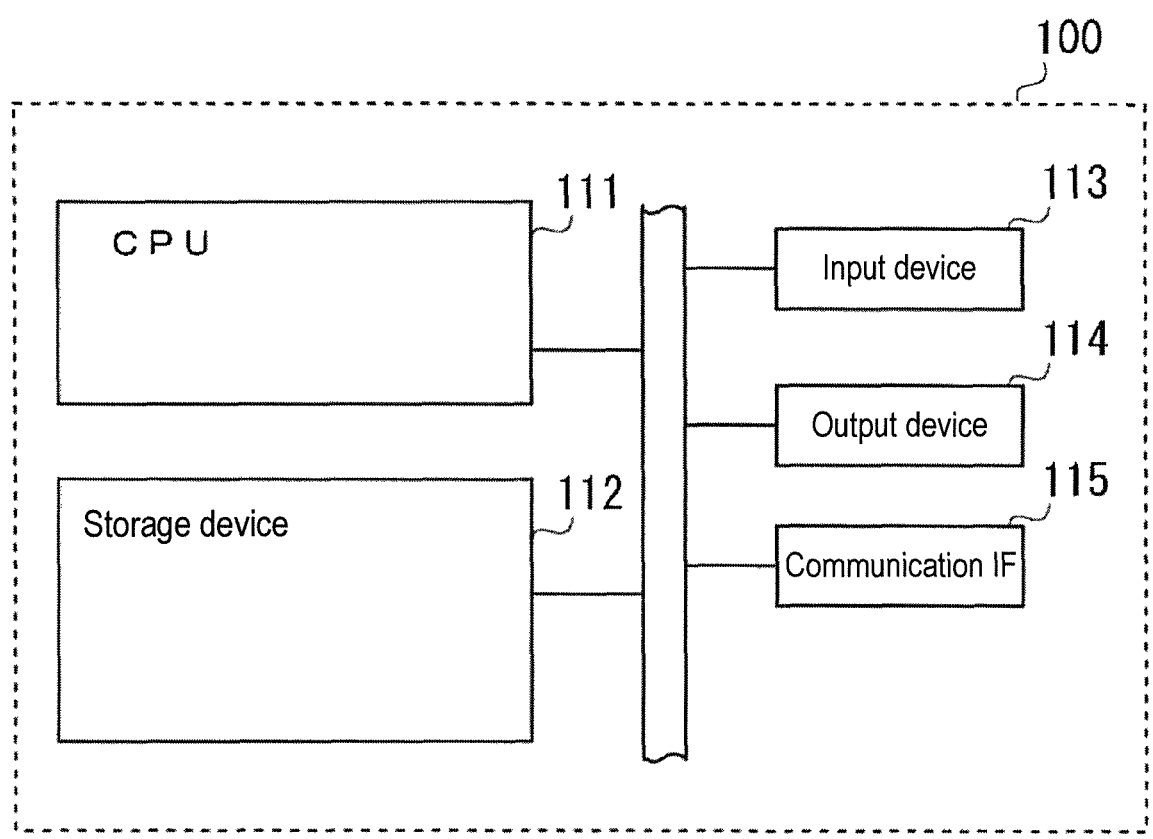
FIG. 6 is a diagram illustrating a hardware configuration of a computer (information processing device)

FIG. 6 is a diagram illustrating a hardware configuration of a computer (information processing device) such as the composite sensor unit 1, the user terminal 2, the gateway 3, and the application server 4.

As illustrated in FIG. 6, the computer 100 includes a memory 112, an input device 113, an output device 114, and a communication interface (communication IF) 115, which are connected to a CPU 111 through a bus.

The memory 112 includes a main storage device and an auxiliary storage device. The main storage device is used as a work area of the CPU 111, a storage area for programs or data, and a buffer area for communication data. For example, the main storage device is formed by a random access memory (RAM) or a combination of the RAM and a read only memory (ROM).

The auxiliary storage device stores a program executed by the CPU 111 and data used during the execution of the program. For example, the auxiliary storage device is a hard disk drive (HDD), a solid state drive (SSD), a flash memory, or an electrically erasable programmable read-only memory (EEPROM). The auxiliary storage device includes a portable storage medium detachably attached to the computer 100. For example, the portable storage medium is a universal serial bus (USB) memory. The auxiliary storage device includes a disk storage medium such as a CD-ROM, a DVD-ROM, and a DVD-R and a drive device of a disk storage medium. The disk storage medium is one of the portable storage mediums.

The input device 113 is used to input the information or the data to the computer 100. Examples of the input device 113 include a pointing device such as a button, a key, and a mouse, a touch panel, a camera, a bar code reader, a scanner, and an IC chip reading device by NFC. The input device 113 may include a voice input device such as a microphone.

The output device 114 outputs the information or the data. Examples of the output device include a display device, a printer, a device that writes the data in a storage medium, and an IC chip writing device by NFC. The output device 114 may include a sound output device such as a speaker. The communication IF 115 is an interface that is connected to the network and communicates with other devices. For example, the communication IF 115 is a local area network (LAN) card.

The CPU 111 corresponds to a processing device of the embodiment. The CPU 111 is also called a micro processor unit (MPU), a microprocessor, or a processor. The CPU 111 is not limited to a single processor, but may have a multi-processor configuration. A single CPU connected by a single socket may have a multi-core configuration. At least part of pieces of processing of the above units may be performed by a processor except for the CPU, for example, a dedicated processor such as a digital signal processor (DSP), a graphics processing unit (GPU), a numerical operation processor, a vector processor, and an image processor. At least part of the pieces of processing of the above units may be an integrated circuit (IC) or another digital circuit. An analog circuit may be included in at least a part of the above units. The integrated circuit includes an LSI, an application specific integrated circuit (ASIC), and a programmable logic device (PLD). For example, the PLD includes a field-programmable gate array (FPGA). Each of the above units may be a combination of the processor and the integrated circuit. For example, the combination is called a micro controller unit (MCU), a system-on-a-chip (SoC), a system LSI, or a chipset.

The CPU 111 loads the program stored in the auxiliary storage device on the main storage device, and executes the program. For the composite sensor unit 1, the CPU 111 acts as the data acquisition unit 12, the event determination unit 13, the operation setting unit 14, the memory 15, and the communication controller 16.

Figure 7:
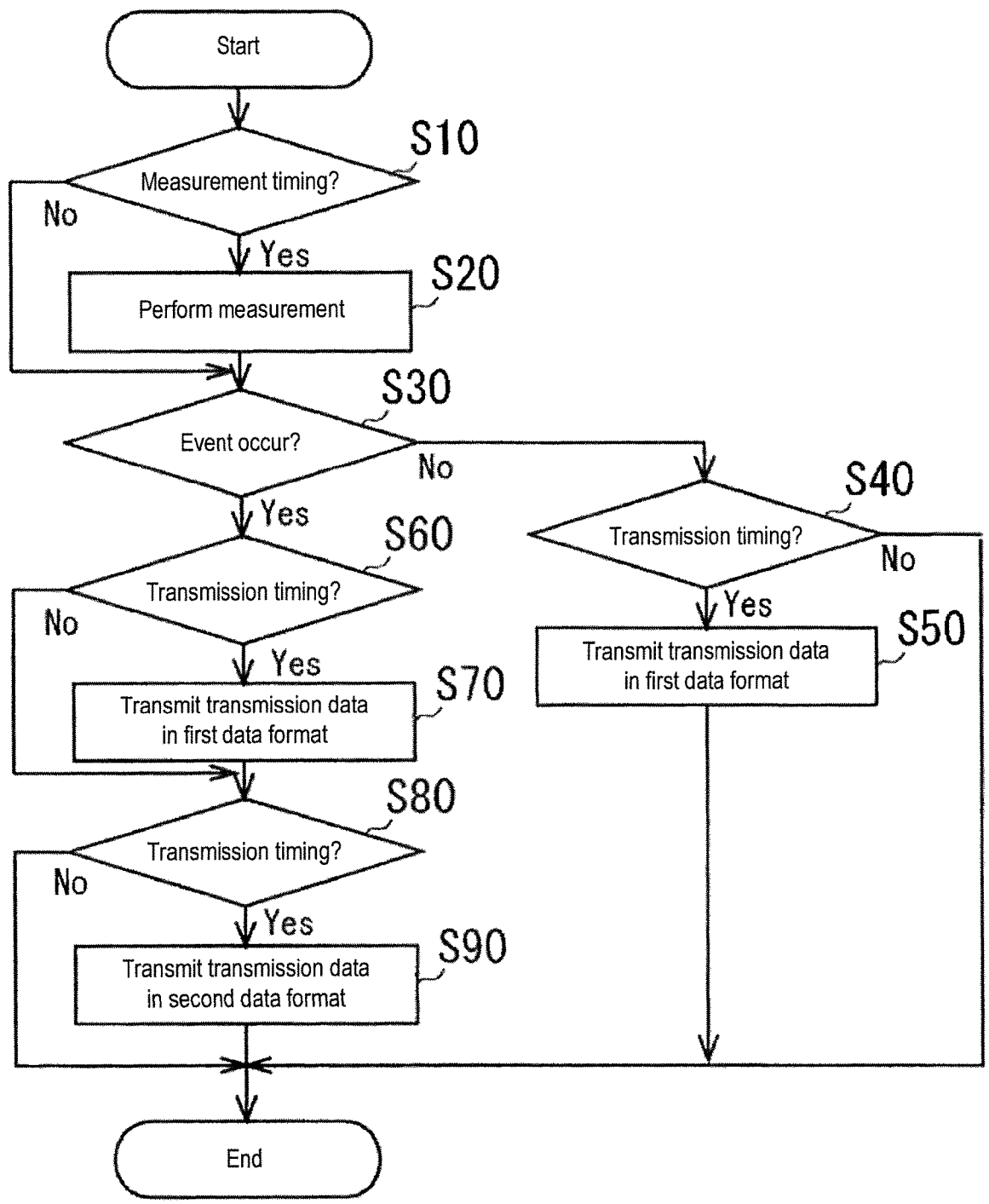
FIG. 7 is a flowchart illustrating processing in which the composite sensor unit performs measurement and transmits a measurement result.

FIG. 7 is a flowchart illustrating processing in which the composite sensor unit 1 performs the measurement using the sensors 1A to 1Q and transmits the measurement result. The composite sensor unit 1 starts the processing in FIG. 7 in the case where power is turned on or in the case where an instruction to start the measurement is issued. It is determined whether the composite sensor unit 1 reaches the measurement timing (step S10). The measurement timing is preset so as to perform the measurement at predetermined time intervals such as every one second. Only one piece of processing of determining whether the composite sensor unit 1 reaches the measurement timing is illustrated in the example of FIG. 7, but the sensors 1A to 1Q may perform the measurement at different timing.

When an affirmative determination is made in step S10, each of the sensors 1A to 1Q performs the measurement, and the data acquisition unit 12 acquires the measurement data from each of the sensors 1A to 1Q (step S20). When a negative determination is made in step S10, the composite sensor unit 1 proceeds to step S30 without performing step S20.

In step S30, the composite sensor unit 1 determines whether the event occurs. When the negative determination is made in step S30, it is determined whether the composite sensor unit 1 reaches the transmission timing (step S40). At this point, the transmission timing is preset so as to transmit at predetermined time intervals such as every 318.75 ms. In the embodiment (2-1), the transmission data is stored in a BLE advertise packet and transmitted at predetermined intervals.

The composite sensor unit 1 ends the processing in FIG. 7 when the negative determination is made in step S40, and the composite sensor unit 1 transmits the transmission data in the first format F1 when the affirmative determination is made (step S50). At this point, the transmission data in the first format F1 has a configuration including a measurement number, a format number, temperature, humidity, and illuminance as illustrated in FIG. 3. For example, the measurement number is identification information, such as a serial number, which specifies the measurement timing. For example, the format number is identification information identifying the format of the transmission data. The format number "1" means the first format F1. The first format F1 has a configuration including the temperature, the humidity, and the illuminance as the type of the measurement data.

On the other hand, when the affirmative determination is made in step S30, it is determined whether the composite sensor unit 1 reaches the transmission timing similarly to step S40 (step S60). In the case where the event occurs, in order to alternately transmit the first format F1 and the second format F2, it is determined that the composite sensor unit 1 of the embodiment (2-1) reaches the transmission timing of the first format F1 after a predetermined time elapses since the transmission of the second format F2. When the affirmative determination is made in step S60, the composite sensor unit 1 transmits the transmission data in the first format F1 (step S70). When the negative determination is made in step S60, the composite sensor unit 1 proceeds to step S80 without performing step S70.

It is determined whether the composite sensor unit 1 reaches the transmission timing similarly to step S40 (step S80). The composite sensor unit 1 of the embodiment (2-1) determines that it reaches the transmission timing of the second format F2 after a predetermined time elapses since the transmission of the first format F1. The composite sensor unit 1 ends the processing in FIG. 7 when the negative determination is made in step S80, and the composite sensor unit 1 transmits the transmission data in the second format F2 when the affirmative determination is made (step S90). The composite sensor unit 1 repeatedly performs the processing in FIG. 7 until the power is turned off or until an instruction to stop the measurement is issued.

Figure 8:
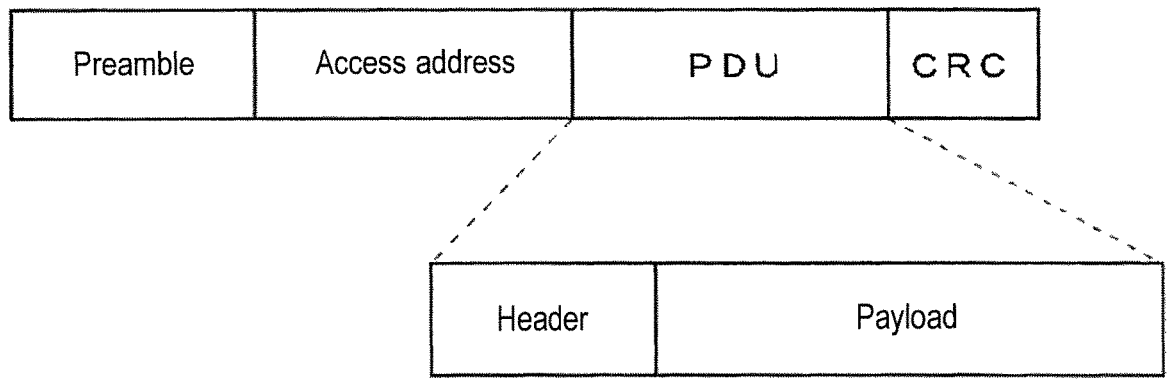
FIG. 8 is a diagram illustrating a frame format of an advertising packet.

At this point, as illustrated in FIG. 3, the transmission data in the second format F2 has a format number "2", and includes the SI value and the seismic intensity as the type of the measurement data. FIG. 8 is a diagram illustrating a frame format of an advertising packet. In steps S50, S70, S90, the communication controller 16 of the composite sensor unit 1 stores the transmission data in the first format F1 or the second format F2 in a payload portion of a protocol data unit (PDU) in the advertise packet of FIG. 8. For example, the transmission data is stored in the payload portion of the advertise packet and transmitted. Consequently, the user terminal 2 that receives the advertise packet can refer to the format number of the payload portion to recognize what type of the measurement data is stored. For example, the measurement data in the advertise packet is acquired as the pieces of data of the temperature, the humidity, and the illuminance for the format number "1", and the measurement data in the advertise packet is acquired as the pieces of data of the SI Value and the seismic intensity for the format number "2".

In the embodiment (2-1), in the case where the event occurs, by way of example, the transmission data is transmitted in the second format F2. However, the format of the transmission data transmitted after the event may be determined according to the event. For example, a correspondence relationship between the event and the format such as the second format F2 in the case where an earthquake occurs as the event, an n-th format Fn in the case where a fire occurs, and an m-th format Fm in the case where a power failure occurs is stored in the memory, and the communication controller 16 may transmit the transmission data in a format corresponding to the occurred event based on the correspondence relationship.

As described above, in the embodiment (2-1), the transmission data is transmitted in the first format F1 in the case where the event does not occur, and the transmission data in the first format F1 and the transmission data in the second format F2 are alternately transmitted in the case where the event occurs. For example, in the embodiment (2-1), a time slot of every 318.75 ms is time-divided so as to alternately transmit the transmission data in the first format F1 and the transmission data in the second format F2 in the case where the event occurs.

As described above, according to the embodiment (2-1), in the case where the event occurs, the format of the transmission data can be changed to transmit the appropriate measurement data corresponding to the occurred event. Consequently, the transmission can be performed without reducing an information amount such as omission of some pieces of data.

In the embodiment (2-1), the transmission data is periodically transmitted, so that the occurrence of an abnormality of the composite sensor unit can be detected in the case where the user terminal 2 or the gateway 3 cannot receive the transmission data at predetermined timing.

(2-2)

An embodiment (2-2) in which a transmission frequency of a specific format is changed after the occurrence of the event will be described below with reference to FIGS. 9 and 10. The same element as that in the above application example and the embodiment (2-1) is denoted by the same reference numeral, and the description thereof will be omitted.

Figure 9:
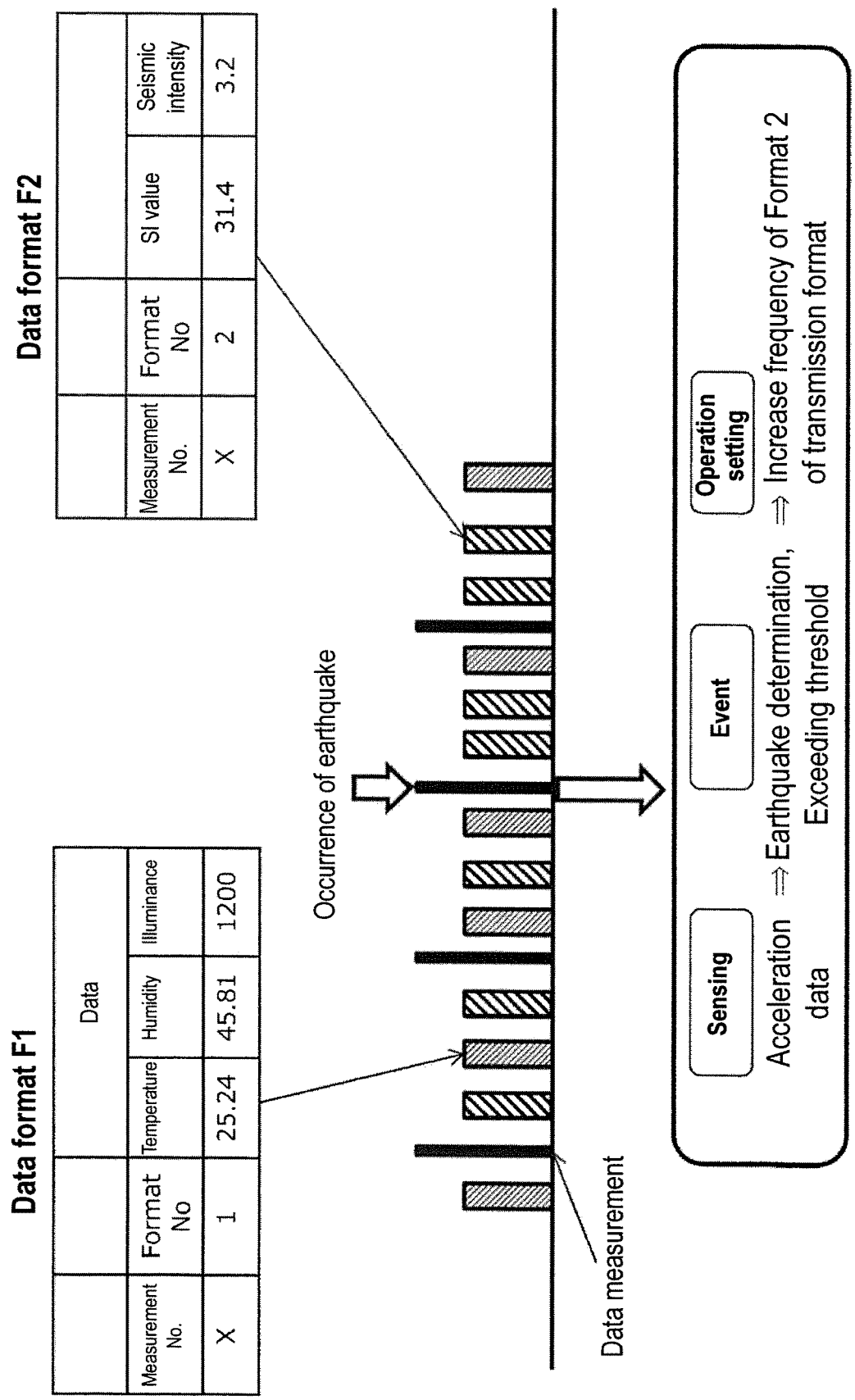
FIG. 9 is a diagram illustrating a data format of transmission data in an embodiment (2-2)
Figure 10:
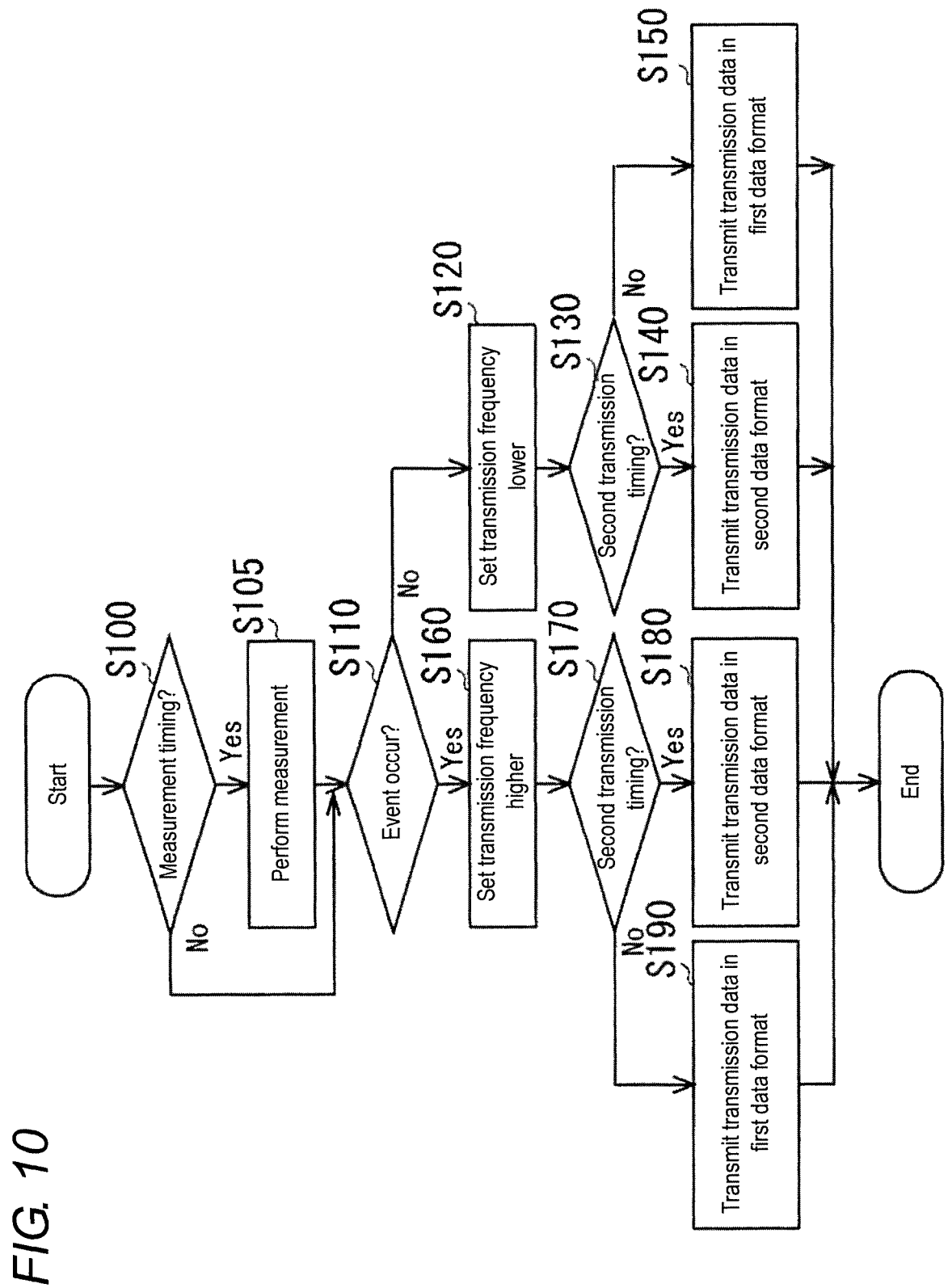
FIG. 10 is a flowchart illustrating processing in which a composite sensor unit performs measurement and transmits a measurement result in the embodiment (2-2)

FIG. 9 is a diagram illustrating a data format of transmission data in the embodiment (2-2), and FIG. 10 is a flowchart illustrating processing in which the composite sensor unit 1 of the embodiment (2-2) performs the measurement using the sensors 1A to 1Q and transmits the measurement result.

Upon starting the processing in FIG. 10, it is determined whether the composite sensor unit 1 reaches the measurement timing (step S100). The measurement timing is preset so as to perform the measurement at predetermined time intervals such as every one second. Only one piece of processing of determining whether the composite sensor unit 1 reaches the measurement timing is illustrated in the example of FIG. 10, but the sensors 1A to 1Q may perform the measurement at different timing.

When the affirmative determination is made in step S100, each of the sensors 1A to 1Q performs the measurement, and the data acquisition unit 12 acquires the measurement data from each of the sensors 1A to 1Q (step S105). When the negative determination is made in step S100, the composite sensor unit 1 proceeds to step S110 without performing step S105.

In step S110, the composite sensor unit 1 determines whether the event occurs. When the negative determination is made in step S110, the composite sensor unit 1 sets a frequency of the transmission data in a specific format to a lower frequency (step S120). In the embodiment (2-2), the frequency of the transmission data in the second format is set lower as compared to a case where the event occurs. For example, the ratio between the transmission frequency of the transmission data in the first format and the transmission frequency of the transmission data in the second format is set to 1:1 as illustrated in FIG. 9.

Based on the frequency set in step S120, it is determined whether the composite sensor unit 1 reaches the transmission timing of the transmission data in the second format (step S130). When the affirmative determination is made in step S130, the composite sensor unit 1 transmits the transmission data in the second format (step S140). When the negative determination is made in step S130, the composite sensor unit 1 transmits the transmission data in the first format (Step S150). The composite sensor unit 1 repeatedly performs the processing in FIG. 10 until the power is turned off or until the instruction to stop the measurement is issued. Consequently, in the case where the event does not occur, the composite sensor unit 1 alternately makes the affirmative determination and the negative determination in step S130, and alternately transmits the transmission data in the first format and the transmission data in the second format.

On the other hand, when the event occurs to make the affirmative determination in step 110, the composite sensor unit 1 sets the frequency of the transmission data in a specific format to a higher frequency (step S160). In the embodiment (2-2), the frequency of the transmission data in the second format is set higher as compared to a case where the event occurs. For example, the ratio between the transmission frequency of the transmission data in the first format and the transmission frequency of the transmission data in the second format is set to 1:2 as illustrated in FIG. 9.

Based on the frequency set in step S160, it is determined whether the composite sensor unit 1 reaches the transmission timing of the transmission data in the second format (step S170). When the affirmative determination is made in step S170, the composite sensor unit 1 transmits the transmission data in the second format (step S180). When the negative determination is made in step S170, the composite sensor unit 1 transmits the transmission data in the first format (Step S190). In the case where the event occurs as described above, the composite sensor unit 1 makes the affirmative determination and the negative determination at a ratio of 1:2 in step S170, and transmits the transmission data in the first format and the transmission data in the second format at a ratio of 1:2.

As described above, in the embodiment (2-2), in the case where the event occurs, the transmission frequency of the transmission data in the second format F2 is set higher as compared to a case where the event does not occur. Consequently, more measurement data corresponding to the occurred event can be acquired in the case where the event occurs. In the embodiment (2-2), the transmission frequency of the measurement data in the first format is decreased by increasing the transmission frequency of the measurement data in the second format after the occurrence of the event. However, the embodiment (2-2) is not limited to this configuration. For example, the transmission frequency of the measurement data in the second format may be increased without decreasing the transmission frequency of the measurement data in the first format by increasing the transmission frequency of the advertise packet as compared to a case where the event does not occur, namely, by shortening a transmission interval after the occurrence of the event.

(2-3)

An embodiment (2-3), in which the number of measurement times of the measurement data is increased after the occurrence of the event and the transmission data in a format including the increased measurement data is transmitted, will be described below with reference to FIGS. 11 and 12. The same element as that in the above application example and the embodiments is denoted by the same reference numeral, and the description thereof will be omitted.

Figure 11:
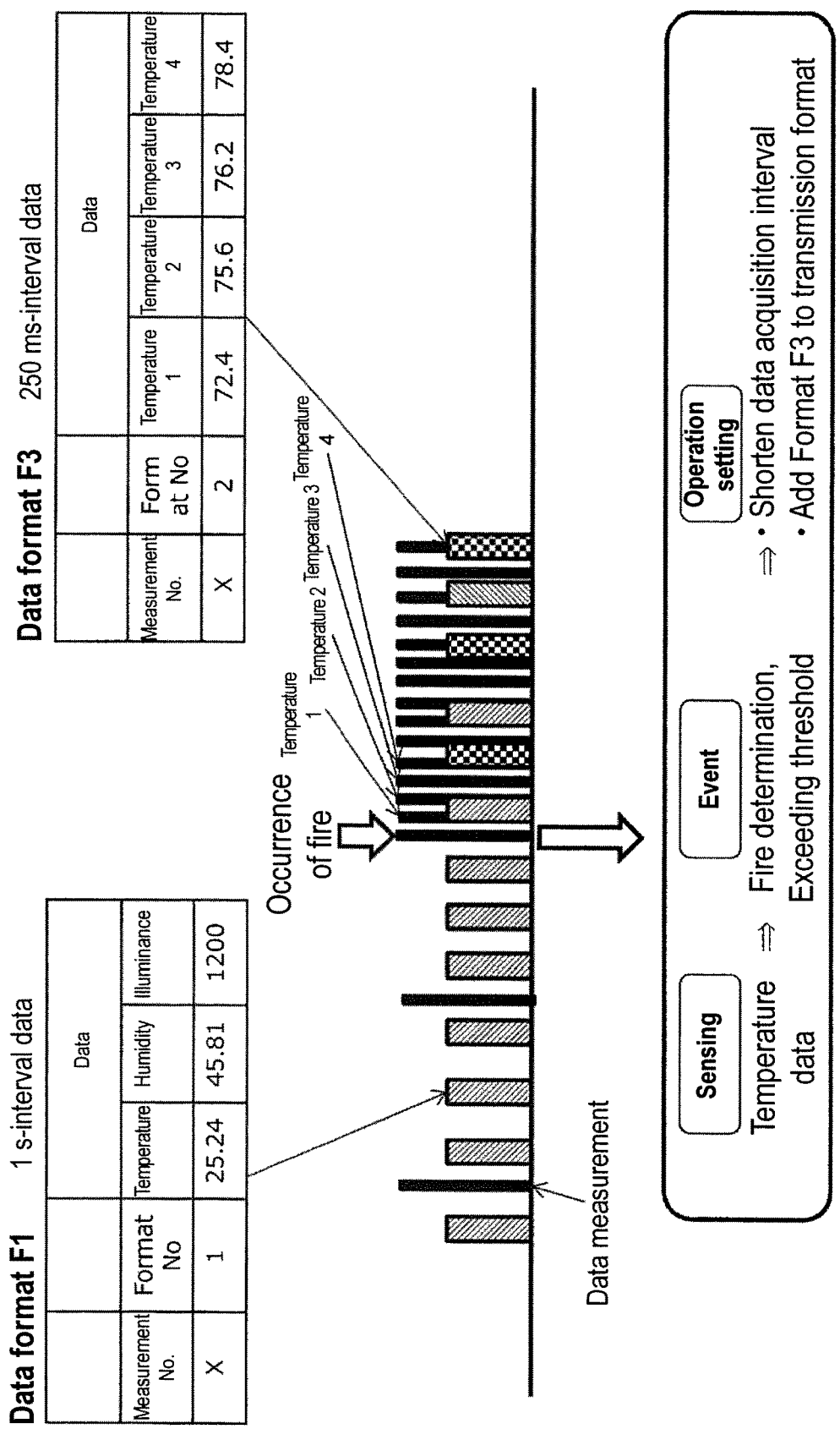
FIG. 11 is a diagram illustrating a data format of transmission data in an embodiment (2-3)
Figure 12:
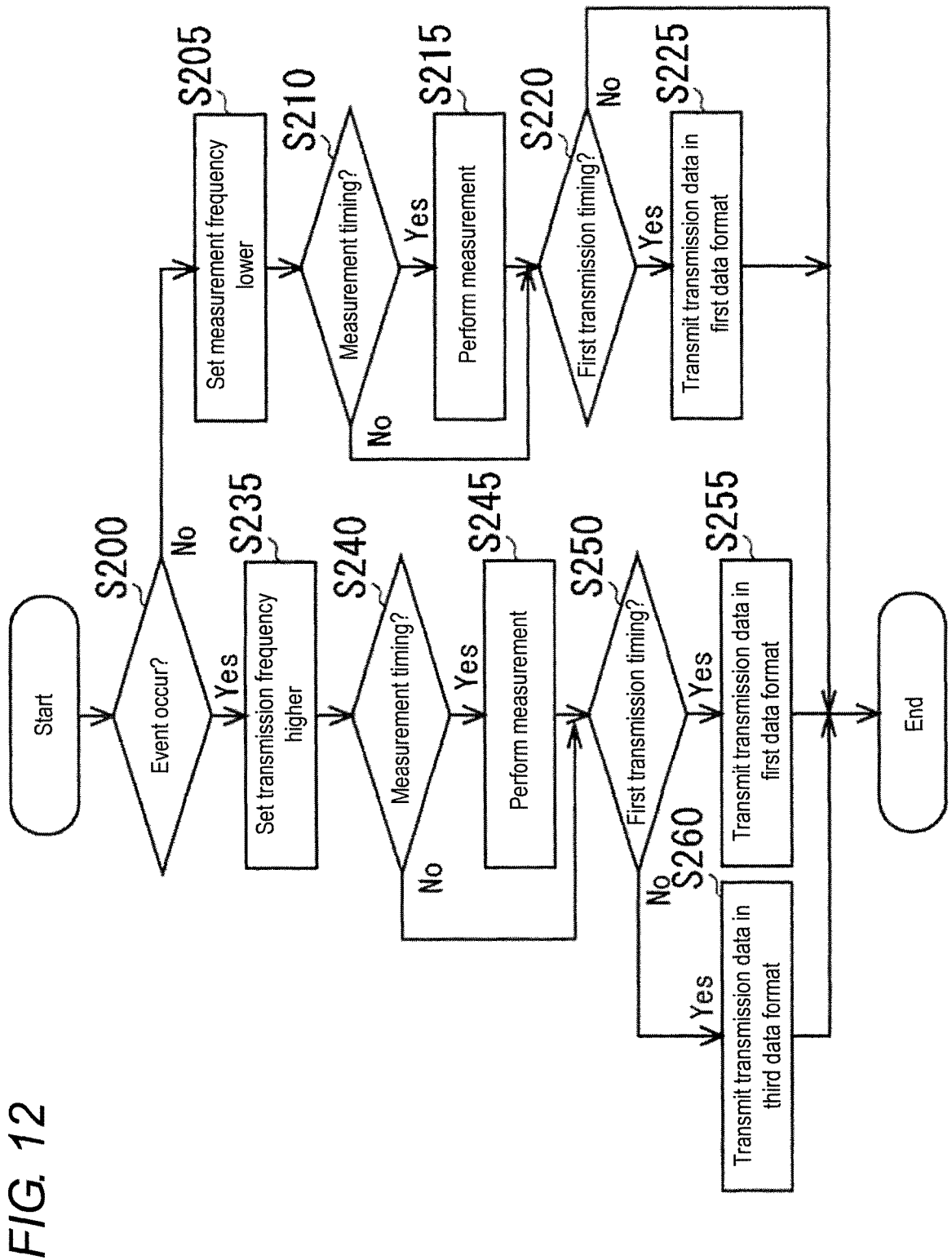
FIG. 12 is a flowchart illustrating processing in which a composite sensor unit performs measurement and transmits a measurement result in the embodiment (2-3)

FIG. 11 is a diagram illustrating a data format of transmission data in the embodiment (2-3), and FIG. 12 is a flowchart illustrating processing in which the composite sensor unit 1 of the embodiment (2-3) performs the measurement using the sensors 1A to 1Q and transmits the measurement result.

Upon starting the processing in FIG. 12, the composite sensor unit 1 determines whether the event occurs (step S200). When the negative determination is made in step S200, the composite sensor unit 1 sets the measurement interval of each of the sensors 1A to 1Q to a standard interval, and sets the measurement frequency lower as compared to a case where the event occurs (step S205). It is determined whether the composite sensor unit 1 reaches the measurement timing based on the measurement frequency set in step S205 (step S210). The measurement timing is preset so as to perform the measurement at predetermined time intervals such as every one second. Only one piece of processing of determining whether the composite sensor unit 1 reaches the measurement timing is illustrated in the example of FIG. 12, but the sensors 1A to 1Q may perform the measurement at different timing.

When the affirmative determination is made in step S210, each of the sensors 1A to 1Q performs the measurement, and the data acquisition unit 12 acquires the measurement data from each of the sensors 1A to 1Q (step S215). When the negative determination is made in step S210, the composite sensor unit 1 proceeds to step S220 without performing step S215.

In step S220, it is determined whether the composite sensor unit 1 reaches the transmission timing of the transmission data. The composite sensor unit 1 ends the processing in FIG. 12 when the negative determination is made in step S220, and the composite sensor unit 1 transmits the transmission data in the first format F1 when the affirmative determination is made (step S225).

On the other hand, when the affirmative determination is made in step S200, the composite sensor unit 1 sets the measurement interval of each of the sensors 1A to 1Q shorter than the standard interval, and sets the measurement frequency higher as compared to a case where the event does not occur (step S235). It is determined whether the composite sensor unit 1 reaches the measurement timing based on the measurement frequency set in step S235 (step S240). The measurement timing is preset so as to perform the measurement at predetermined time intervals such as every 250 ms.

When the affirmative determination is made in step S240, each of the sensors 1A to 1Q performs the measurement, and the data acquisition unit 12 acquires the measurement data from each of the sensors 1A to 1Q (step S245). When the negative determination is made in step S240, the composite sensor unit 1 proceeds to step S250 without performing step S245.

In step S250, it is determined whether the composite sensor unit 1 reaches the transmission timing of the transmission data in the first format. When the affirmative determination is made in step S250, the composite sensor unit 1 transmits the transmission data in the first format (step S255). When the negative determination is made in step S250, the composite sensor unit 1 transmits the transmission data in a third data format F3 (Step S260). At this point, the transmission data in the third data format F3 includes a measurement number, a format number, and temperature data measured at a plurality of measurement timings as illustrated in FIG. 11. In the example of FIG. 11, the third data format F3 includes the four pieces of temperature data measured at intervals of 250 ms.

As described above, in the embodiment (2-3), in the case where the event occurs, the measurement frequency of the sensor is set higher as compared to a case where the event does not occur, and the transmission data in the third data format F3 is transmitted, the transmission data including the measurement data measured at the plurality of measurement timings. Consequently, more measurement data corresponding to the occurred event can be acquired in the case where the event occurs.

(2-4)

An embodiment (2-4) in which data including data indicating a malfunction is transmitted in the case where the malfunction occurs in the composite sensor unit 1 will be described below with reference to FIGS. 13 and 14. The same element as that in the above application example and the embodiments is denoted by the same reference numeral, and the description thereof will be omitted.

Figure 14:
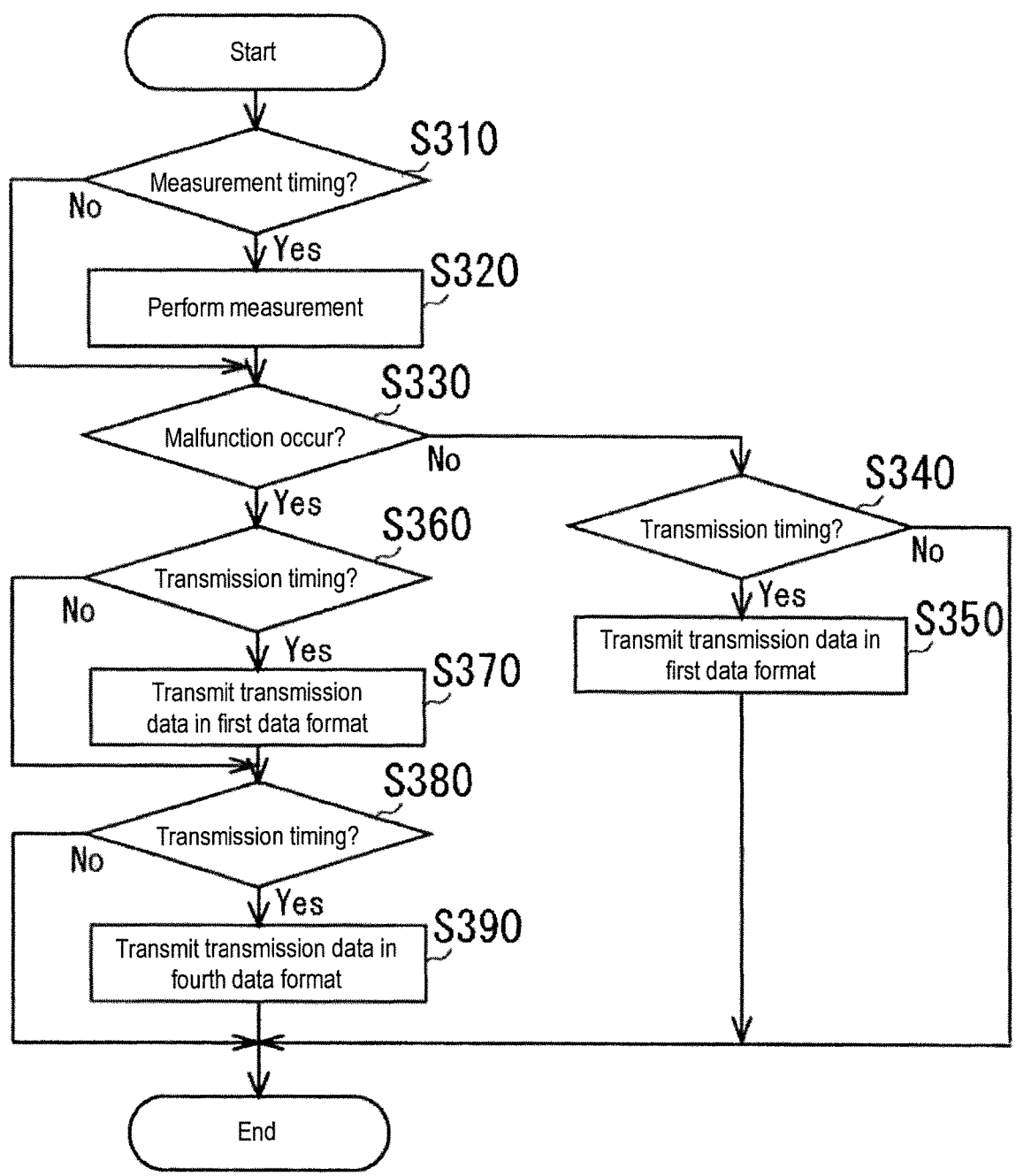
FIG. 14 is a flowchart illustrating processing in which a composite sensor unit performs measurement and transmits a measurement result in the embodiment (2-4)

Upon starting the processing in FIG. 14, it is determined whether the composite sensor unit 1 reaches the measurement timing (step S310). The measurement timing is preset so as to perform the measurement at predetermined time intervals such as every one second. Only one piece of processing of determining whether the composite sensor unit 1 reaches the measurement timing is illustrated in the example of FIG. 14, but the sensors 1A to 1Q may perform the measurement at different timing.

When the affirmative determination is made in step S310, each of the sensors 1A to 1Q performs the measurement, and the data acquisition unit 12 acquires the measurement data from each of the sensors 1A to 1Q (step S320). When the negative determination is made in step S310, the composite sensor unit 1 proceeds to step S330 without performing step S320.

In step S330, the composite sensor unit 1 determines whether the malfunction occurs in such a manner that the event determination unit 13 determines whether the event occurs. For example, the event determination unit 13 determines the malfunction of the sensors 1A to 1Q in the case where the values of the measurement data of the sensors 1A to 1Q cannot be acquired or exceed a specified range. When the negative determination is made in step S330, it is determined whether the composite sensor unit 1 reaches the transmission timing (step S340).

The composite sensor unit 1 ends the processing in FIG. 14 when the negative determination is made in step S340, and the composite sensor unit 1 transmits the transmission data in the first format F1 when the affirmative determination is made (step S350).

On the other hand, when the affirmative determination is made in step S330, it is determined whether the composite sensor unit 1 reaches the transmission timing similarly to step S340 (step S360). When the affirmative determination is made in step S360, the composite sensor unit 1 transmits the transmission data in the first format F1 (step S370). When the negative determination is made in step S360, the composite sensor unit 1 proceeds to step S380 without performing step S370.

It is determined whether the composite sensor unit 1 reaches the transmission timing similarly to step S340 (step S380). The composite sensor unit 1 ends the processing in FIG. 14 when the negative determination is made in step S380, and the composite sensor unit 1 transmits the transmission data in a fourth data format F4 when the affirmative determination is made (step S390). The composite sensor unit 1 repeatedly performs the processing in FIG. 14 until the power is turned off or until the instruction to stop the measurement is issued.

Figure 13:
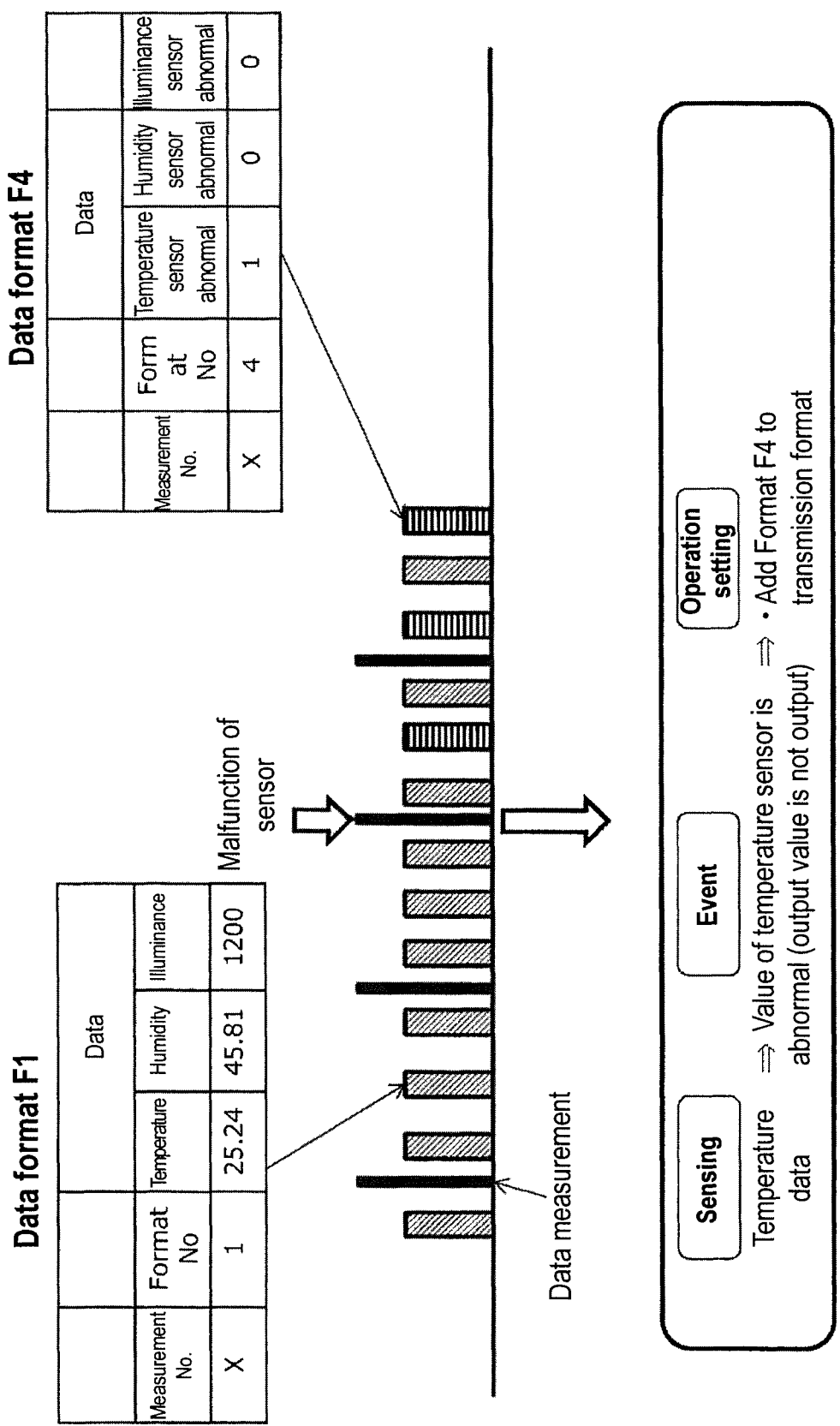
FIG. 13 is a diagram illustrating a data format of transmission data in an embodiment (2-4)

At this point, the transmission data in the fourth data format has a format number "4" as illustrated in FIG. 13, and includes data indicating the malfunction of the composite sensor unit 1. As illustrated in FIG. 13, the communication controller 16 sets the value of the data indicating the malfunction to "1" for the sensor in which the measurement data is abnormal in step S330, and sets the value of the data indicating the malfunction to "0" for the sensor in which the measurement data is not abnormal.

As described above, in the embodiment (2-4), with the case that the malfunction occurs, whether the composite sensor unit 1 operates normally can be indicated by transmitting the data indicating the malfunction, and reliability of the data can be secured.

(2-5)

Figure 15:
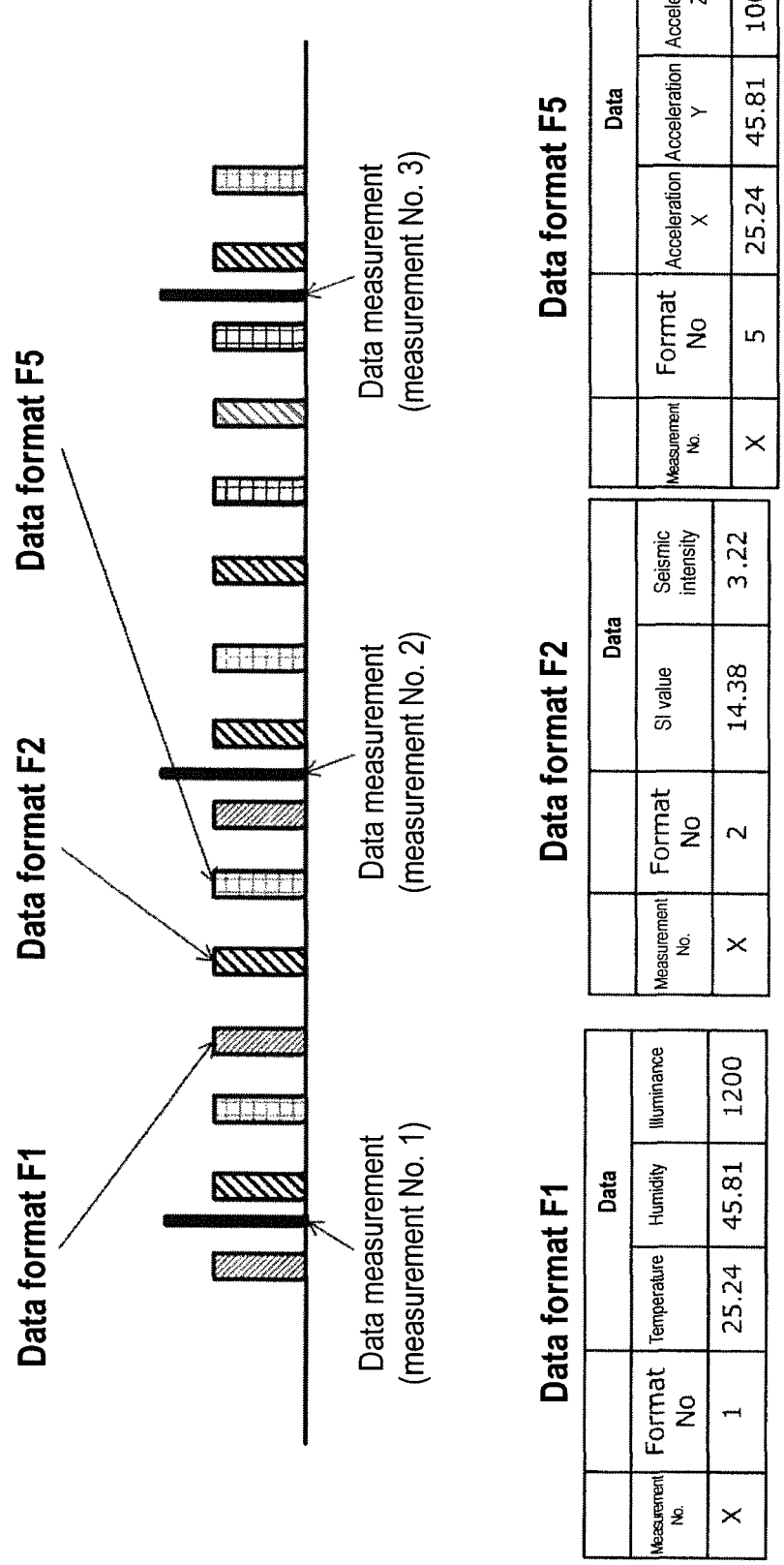
FIG. 15 is a diagram illustrating a data format of transmission data in an embodiment (2-5)

An embodiment (2-5) in which a plurality of types of the measurement data measured by the sensor are distributed to a predetermined number of data formats and transmitted will be described below with reference to FIGS. 15 and 16. The same element as that in the above application example and the embodiments is denoted by the same reference numeral, and the description thereof will be omitted.

Figure 16:
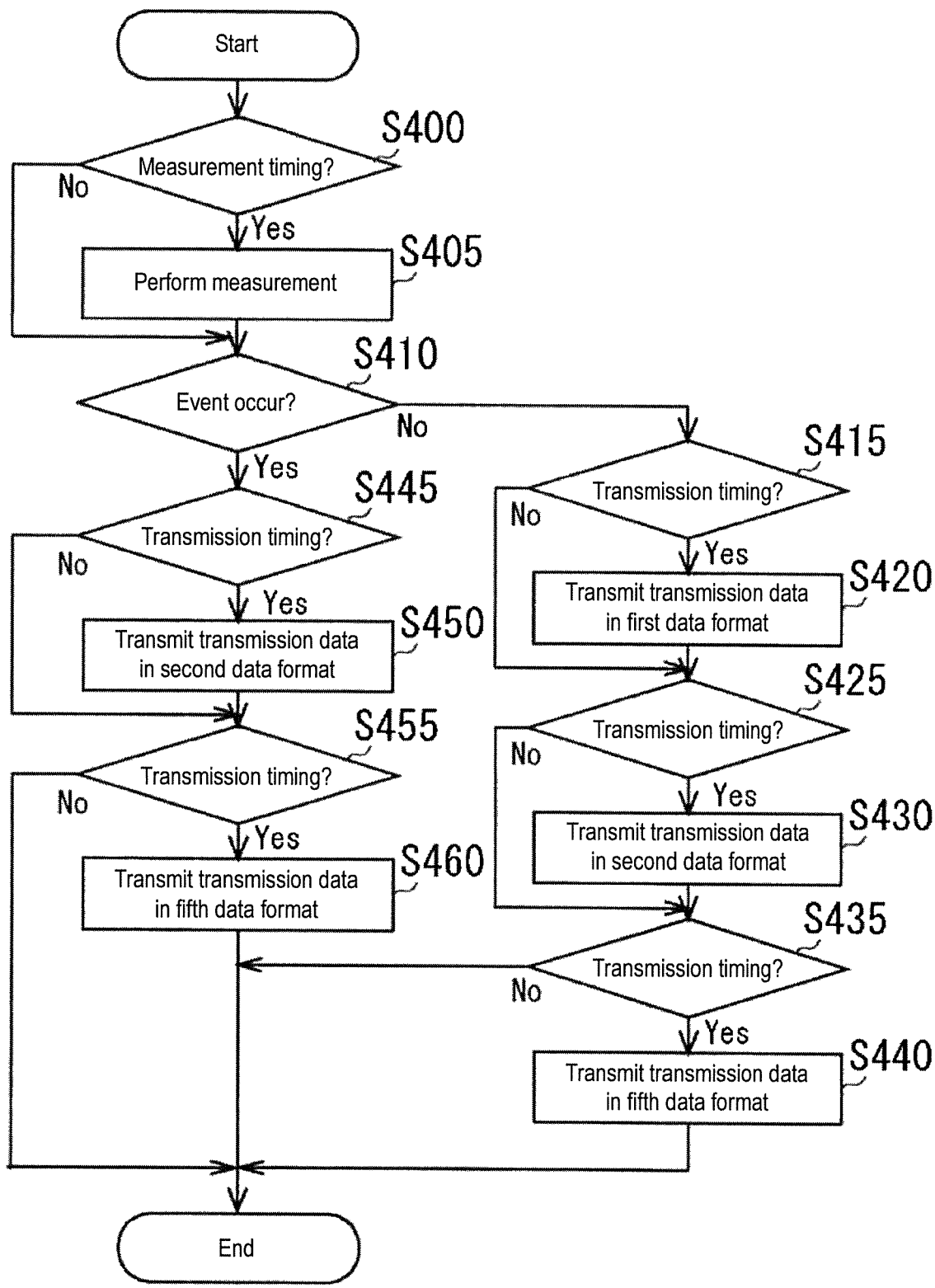
FIG. 16 is a flowchart illustrating processing in which a composite sensor unit performs measurement and transmits a measurement result in the embodiment (2-5)

Upon starting the processing in FIG. 16, it is determined whether the composite sensor unit 1 reaches the measurement timing (step S400). The measurement timing is preset so as to perform the measurement at predetermined time intervals such as every one second. Only one piece of processing of determining whether the composite sensor unit 1 reaches the measurement timing is illustrated in the example of FIG. 16, but the sensors 1A to 1Q may perform the measurement at different timing.

When the affirmative determination is made in step S400, each of the sensors 1A to 1Q performs the measurement, and the data acquisition unit 12 acquires the measurement data from each of the sensors 1A to 1Q (step S405). In the embodiment (2-5), the temperature, the humidity, the illuminance, the SI value, the seismic intensity, acceleration X, acceleration Y, and acceleration Z are acquired from the sensors 1A to 1Q, distributed to the first format F1, the second format F2, and a fifth data format F5, and transmitted as illustrated in FIG. 15. At this point, the fifth data format includes the acceleration X, the acceleration Y, and the acceleration Z as the measurement data.

When the negative determination is made in step S400, the composite sensor unit 1 proceeds to step S410 without performing step S405.

In step S410, the composite sensor unit 1 determines whether the event occurs. When the negative determination is made in step S410, it is determined whether the composite sensor unit 1 reaches the transmission timing of the transmission data in the first format (step S415). For example, in the embodiment (2-5), in order to periodically transmit the first format F1, the second format F2, and the fifth data format F5, the composite sensor unit 1 determines that it reaches the transmission timing of the first format F1 after a predetermined time (for example, 152.5 ms) elapses since the transmission of the fifth data format F5.

When the affirmative determination is made in step S415, the composite sensor unit 1 transmits the transmission data in the first format F1 (step S420).

On the other hand, when the negative determination is made in step S415, the composite sensor unit 1 proceeds to step S425 without performing step S420.

In step S425, it is determined whether the composite sensor unit 1 reaches the transmission timing of the transmission data in the second format. For example, in the embodiment (2-5), in the case where a predetermined time (for example, 152.5 ms) elapses after the transmission of the first format F1, the composite sensor unit 1 determines that it reaches the transmission timing of the transmission data in the second format F2.

When the affirmative determination is made in step S425, the composite sensor unit 1 transmits the transmission data in the second format F2 (step S430).

On the other hand, when the negative determination is made in step S425, the composite sensor unit 1 proceeds to step S435 without performing step S430.

In step S435, it is determined whether the composite sensor unit 1 reaches the transmission timing of the transmission data in the fifth data format F5. For example, in the embodiment (2-5), in the case where a predetermined time (for example, 152.5 ms) elapses after the transmission of the second format F2, it is determined that the composite sensor unit 1 reaches the transmission timing of the transmission data in the fifth data format F5.

When the affirmative determination is made in step S435, the composite sensor unit 1 transmits the transmission data in the fifth data format F5 (step S440).

On the other hand, the processing in FIG. 16 is ended when the negative determination is made in step S435. The composite sensor unit 1 repeatedly performs the processing in FIG. 16 until the power is turned off or until the instruction to stop the measurement is issued.

When the event occurs to make the affirmative determination in step S410, it is determined whether the composite sensor unit 1 reaches the transmission timing of the transmission data in the second format (step S445). For example, in the embodiment (2-5), in the case where the event occurs, in order to alternately transmit the second format F2 and the fifth data format F5, the composite sensor unit 1 determines that it reaches the transmission timing of the second format F2 after a predetermined time (for example, 152.5 ms) elapses since the transmission of the fifth data format F5.

When the affirmative determination is made in step S445, the composite sensor unit 1 transmits the transmission data in the second format F2 (step S450).

On the other hand, when the negative determination is made in step S445, the composite sensor unit 1 proceeds to step S455 without performing step S450.

In step S455, it is determined whether the composite sensor unit 1 reaches the transmission timing of the transmission data in the fifth data format F5. For example, in the case where a predetermined time (for example, 152.5 ms) elapses after the transmission of the second format F2, the composite sensor unit 1 determines that the transmission timing of the transmission data in the fifth data format F5.

When the affirmative determination is made in step S455, the composite sensor unit 1 transmits the transmission data in the fifth data format F5 (step S460).

On the other hand, the processing in FIG. 16 is ended when the negative determination is made in step S455.

As described above, in the embodiment (2-5), even if the pieces of measurement data acquired from the sensors 1A to 1Q cannot be stored in one advertise packet, the pieces of measurement data are distributed into a predetermined number of data formats, and the pieces of transmission data distributed into the predetermined number of data formats are periodically transmitted. Consequently, various types of the measurement data can be transmitted with the advertise packet. In the case where the event occurs, the transmission frequency of the measurement data can be increased according to the occurrence of the event by narrowing the types of data formats to be transmitted. Consequently, a reception-side device can be suppressed from failing to receive the measurement data necessary during the occurrence of the event.

(2-6)

An embodiment (2-6) in which the reception-side device receives the transmission data from a plurality of composite sensor units 1 will be described below with reference to FIG. 17. The same element as that in the above application example and the embodiments is denoted by the same reference numeral, and the description thereof will be omitted.

Figure 17:
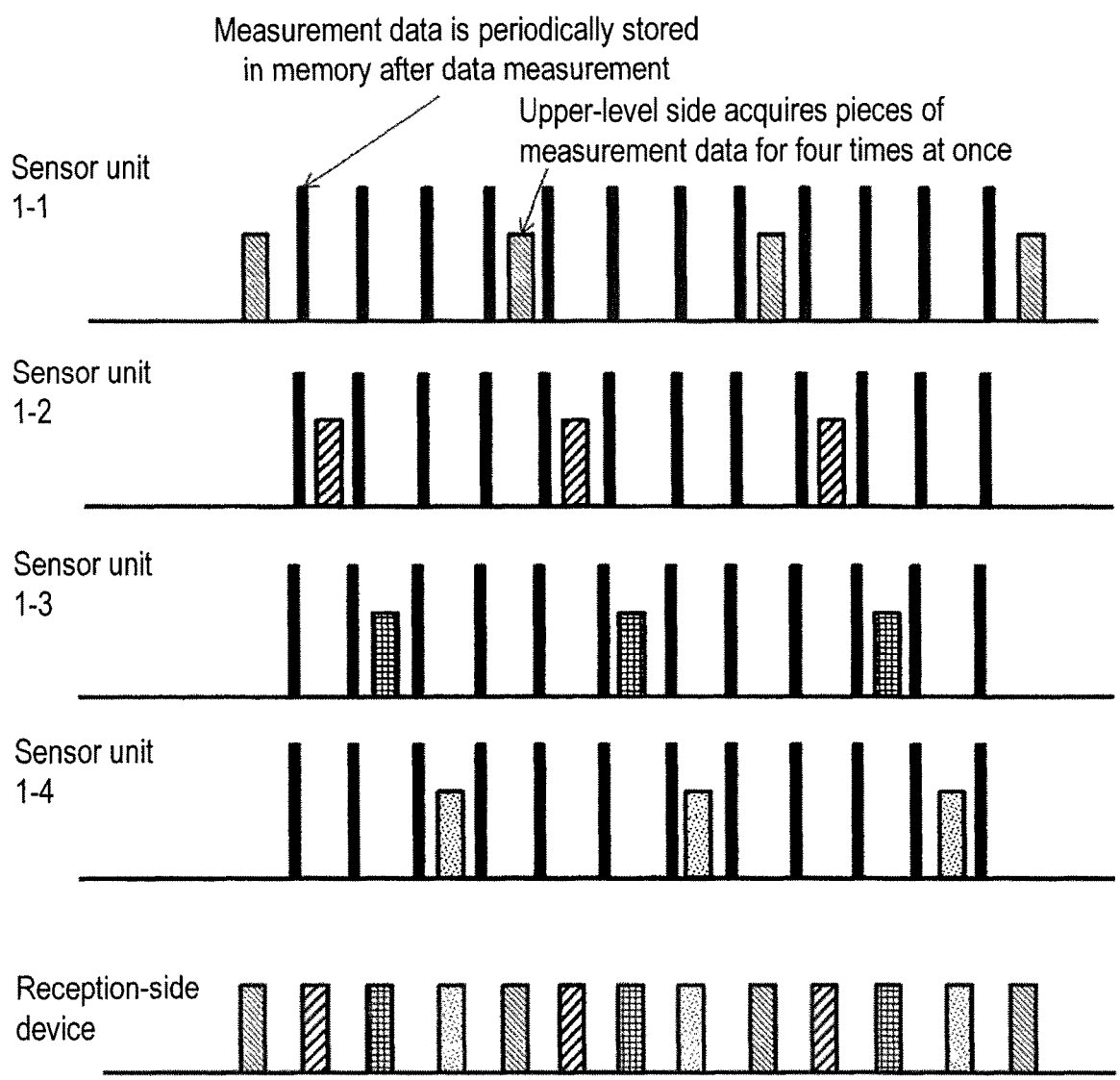
FIG. 17 is a diagram illustrating a data format of transmission data in an embodiment (2-6)

FIG. 17 illustrates an example in which the reception-side device such as the user terminal 2 and the gateway 3 receives data from a plurality of (for example, four) composite sensor units 1 (1-1, 1-2, 1-3, 1-4). For example, each composite sensor unit 1 (1-1, 1-2, 1-3, 1-4) performs the measurement in every 250 ms, and transmits the transmission data in the second data format including the pieces of measurement data for four times in every 1000 ms. In this case, each composite sensor unit 1 (1-1, 1-2, 1-3, 1-4) shifts the timing of transmitting the advertising packet by 250 ms, and the transmission timing of the advertising packet transmitted from each composite sensor unit 1 (1-1, 1-2, 1-3, 1-4) may be changed.

Each time the measurement data is acquired from the sensors 1A to 1Q, each composite sensor unit 1 (1-1, 1-2, 1-3, 1-4) stores the measurement data in the memory, and the transmission data may be transmitted to the reception-side device after each composite sensor unit 1 (1-1, 1-2, 1-3, 1-4) is connected to the reception-side device. In this case, for example, based on the advertise packet transmitted from each composite sensor unit (peripheral) 1, the reception-side device (central) such as the user terminal 2 and the gateway 3 requests connection to each composite sensor unit 1, and establishes the connection between the composite sensor unit 1 and the reception-side device. In the embodiment (2-6), the communication controller 16 of the composite sensor unit 1 is in the form of a connection control device that establishes the connection. The reception-side device that establishes the connection sequentially requests the transmission data, and acquires the transmission data from the composite sensor unit 1.

As described above, according to the embodiment (2-6), the measurement data can be transmitted from the plurality of composite sensor units 1 to the reception-side device.

(2-7)

Figure 18:
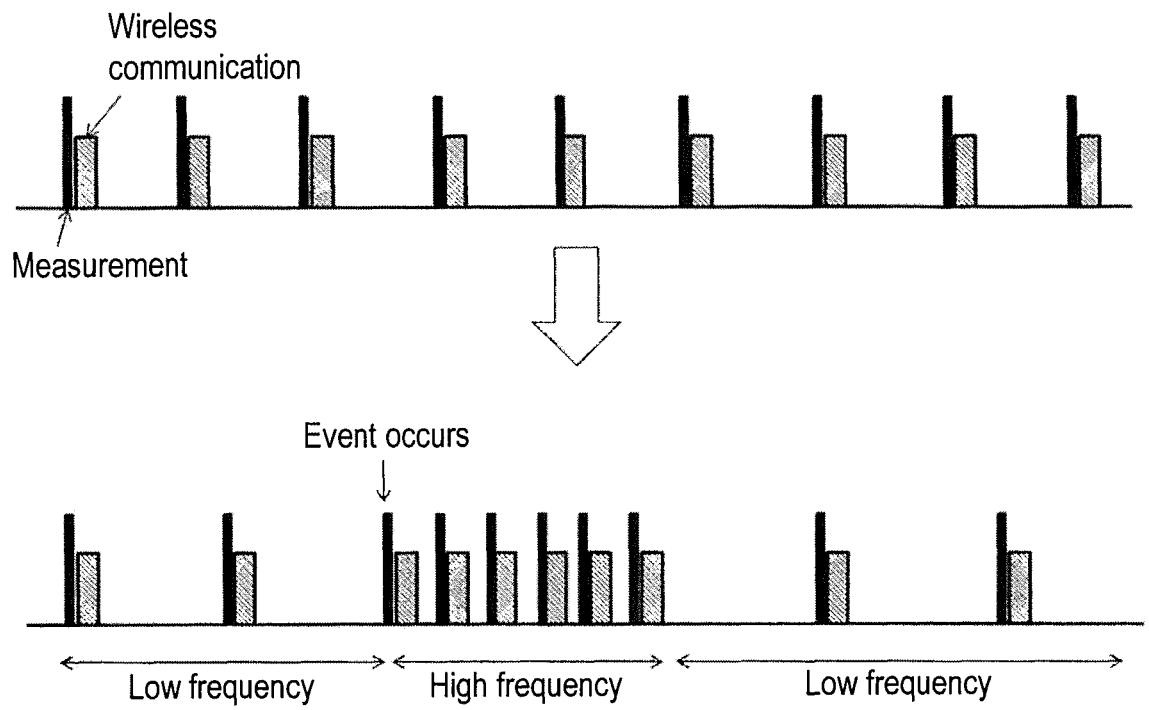
FIG. 18 is an explanatory diagram when measurement timing and transmission timing are changed with high frequency during event occurrence.
Figure 19:
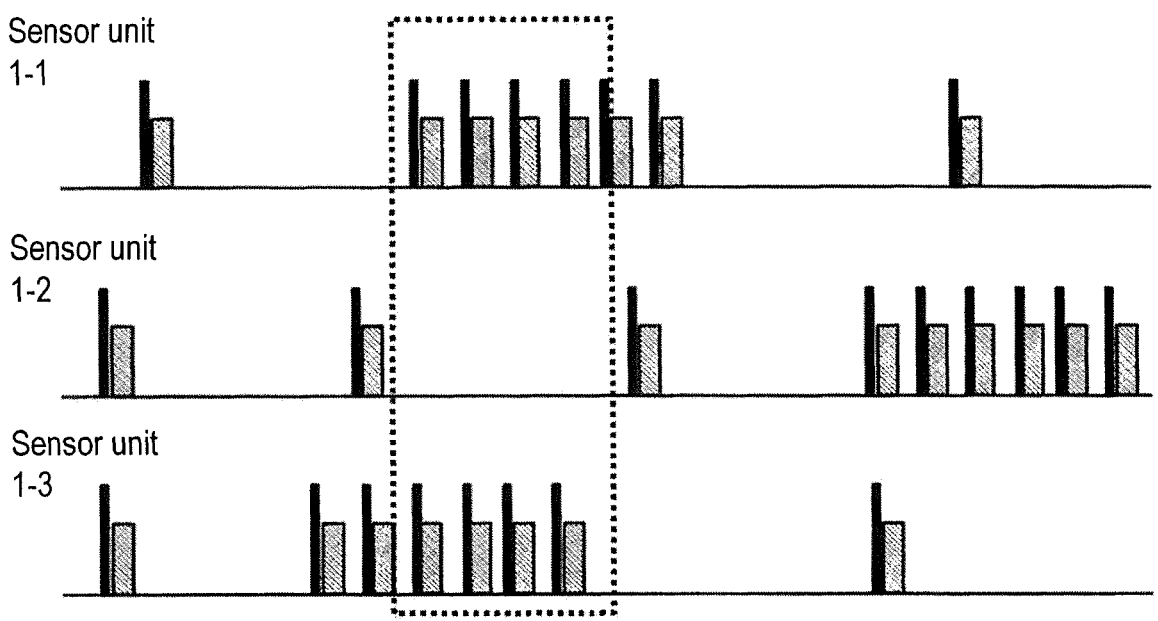
FIG. 19 is a diagram illustrating a problem when the measurement timing and the transmission timing are changed in a plurality of composite sensor units 1.
Figure 20:
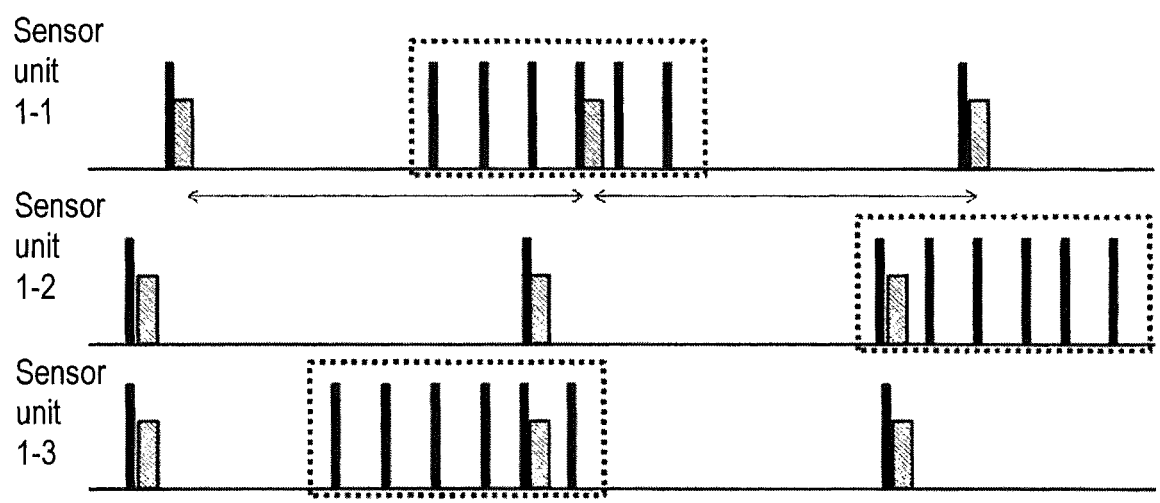
FIG. 20 is a diagram illustrating measurement timing and transmission timing in an embodiment (2-7)

An embodiment (2-7) in which the measurement data is transmitted with the measurement frequency increased in the case where the event occurs will be described below with reference to FIGS. 18 to 22. The same element as that in the above application example and the embodiments is denoted by the same reference numeral, and the description thereof will be omitted. FIG. 18 is an explanatory diagram when the measurement timing and the transmission timing are changed with high frequency during the occurrence of the event, FIG. 19 is a diagram illustrating a problem when the measurement timing and the transmission timing are changed in the plurality of composite sensor units 1, FIG. 20 is a diagram illustrating the measurement timing and the transmission timing in the embodiment (2-7), and FIG. 21 is a flowchart illustrating the processing in which the composite sensor unit 1 performs the measurement using the sensors 1A to 1Q and transmits the measurement result in the embodiment (2-7).

In the example of FIG. 18, the measurement is performed by the sensors 1A to 1Q at predetermined time intervals, and the measurement data is transmitted in each measurement. In this case, during the occurrence of the event, when the measurement frequency is set higher as compared to a case where the event does not occur, the transmission frequency is also increased. As illustrated in FIG. 19, when the occurrence of an event is detected by the plurality of composite sensor units 1, it is conceivable that the transmission timings overlap each other not to receive the transmission data using the reception-side device. For this reason, in the embodiment (2-7), In the case where the event occurs to set the measurement frequency higher, the transmission data is transmitted in a data format including the plurality of pieces of measurement data measured with higher frequency.

Figure 21:
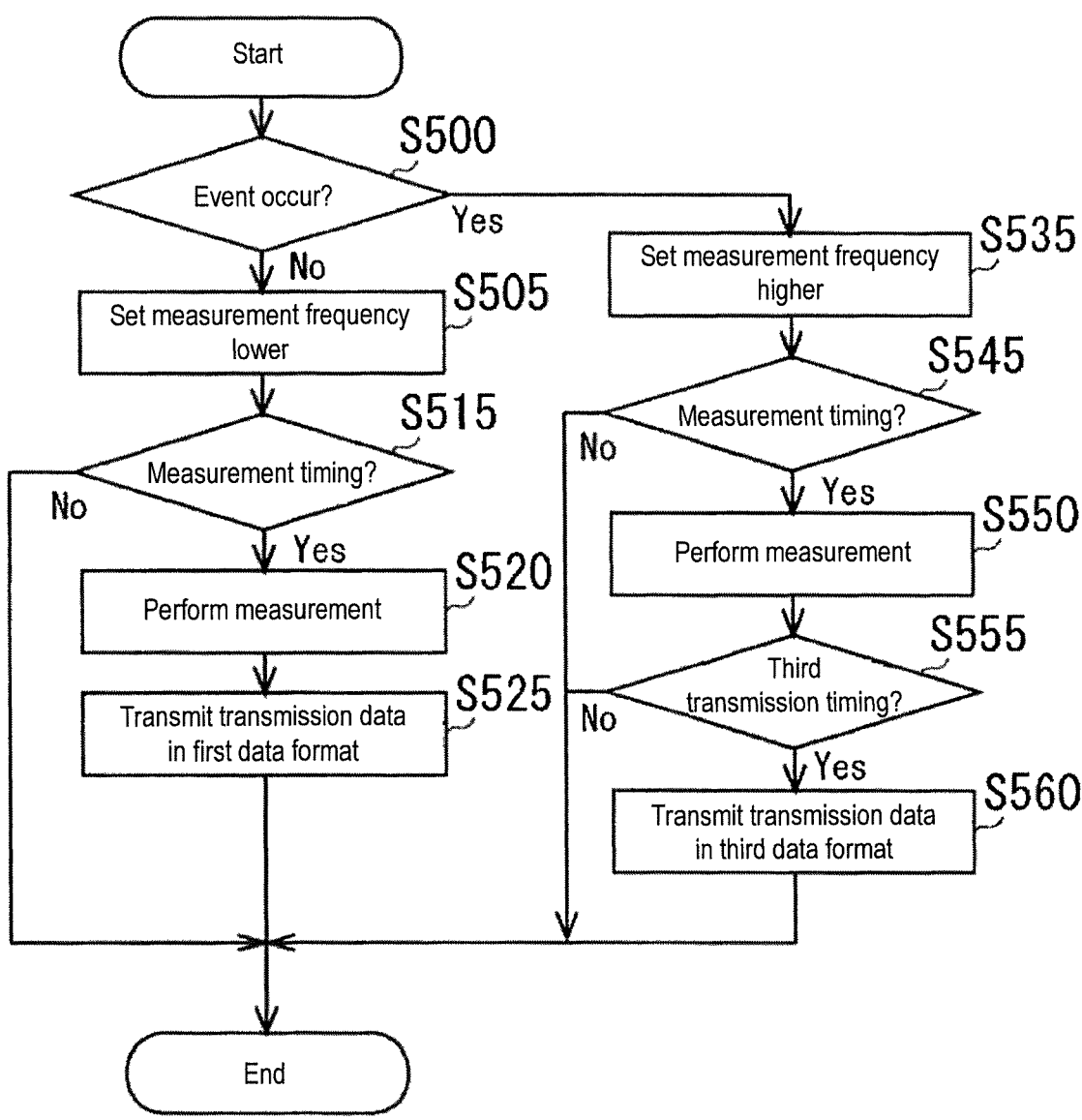
FIG. 21 is a flowchart illustrating processing in which a composite sensor unit performs measurement and transmits a measurement result in the embodiment (2-7)

Upon starting the processing in FIG. 21, the composite sensor unit 1 of the embodiment (2-7) determines whether the event occurs (step S500). When the negative determination is made in step S500, the operation setting unit 14 of the composite sensor unit 1 sets the measurement interval of each of the sensors 1A to 1Q to the standard interval, and sets the measurement frequency lower as compared to a case where the event occurs (step S505).

In step S515, it is determined whether the composite sensor unit 1 reaches the measurement timing based on the measurement frequency set in step S505. The measurement timing is preset so as to perform the measurement at predetermined time intervals such as every one second. Only one piece of processing of determining whether the composite sensor unit 1 reaches the measurement timing is illustrated in the example of FIG. 21, but the sensors 1A to 1Q may perform the measurement at different timing.

When the affirmative determination is made in step S515, each of the sensors 1A to 1Q performs the measurement, and the data acquisition unit 12 acquires the measurement data from each of the sensors 1A to 1Q (step S520).

The composite sensor unit 1 transmits the transmission data in the first format F1 (step S525).

On the other hand, when the negative determination is made in step S515, the composite sensor unit 1 ends the processing in FIG. 21. The composite sensor unit 1 repeatedly performs the processing in FIG. 21 until the power is turned off or until the instruction to stop the measurement is issued. As described above, in the embodiment (2-7), when the negative determination is made in step S515, the processing in FIG. 21 is once ended and the processing in FIG. 21 is repeated again. However, the present invention is not limited to this configuration. For example, the composite sensor unit 1 is brought into a sleep mode for a predetermined period after step S505, the processing proceeds to step S515. When the negative determination is made in step S515, the composite sensor unit 1 may return to the sleep mode to repeat the determination in step S515 in each predetermined period.

On the other hand, when the affirmative determination is made in step S500, the operation setting unit 14 of the composite sensor unit 1 sets the measurement interval of each of the sensors 1A to 1Q shorter than the standard interval, and sets the measurement frequency higher as compared to a case where the event occurs (step S535).

In step S545, it is determined whether the composite sensor unit 1 reaches the measurement timing based on the measurement frequency set in step S535. The measurement timing is preset so as to perform the measurement at predetermined time intervals such as every 250 ms. Only one piece of processing of determining whether the composite sensor unit 1 reaches the measurement timing is illustrated in the example of FIG. 21, but the sensors 1A to 1Q may perform the measurement at different timing.

When the affirmative determination is made in step S545, each of the sensors 1A to 1Q performs the measurement, and the data acquisition unit 12 acquires the measurement data from each of the sensors 1A to 1Q (step S550). On the other hand, when the negative determination is made in step S545, the composite sensor unit 1 ends the processing in FIG. 21. The composite sensor unit 1 repeatedly performs the processing in FIG. 21 until the power is turned off or until the instruction to stop the measurement is issued. As described above, in the embodiment (2-7), when the negative determination is made in step S545, the processing in FIG. 21 is once ended and the processing in FIG. 21 is repeated again. However, the present invention is not limited to this configuration. For example, the composite sensor unit 1 is brought into a sleep mode for a predetermined period after step S535, the processing proceeds to step S545. When the negative determination is made in step S545, the composite sensor unit 1 may return to the sleep mode to repeat the determination in step S545 in each predetermined period.

It is determined whether the composite sensor unit 1 reaches the transmission timing of the transmission data in the third data format F3 (step S555). When the affirmative determination is made in step S555, the composite sensor unit 1 transmits the transmission data in the third data format F3 (step S560).

As described above, in the example of FIG. 21, in the case where the event occurs, the measurement frequency of the sensor is set higher as compared to a case where the event does not occur, and the transmission data in the third data format F3 including the measurement data measured at the plurality of measurement timings is stored in the advertise packet and transmitted. Consequently, more measurement data corresponding to the occurred event can be acquired in the case where the event occurs.

Figure 22:
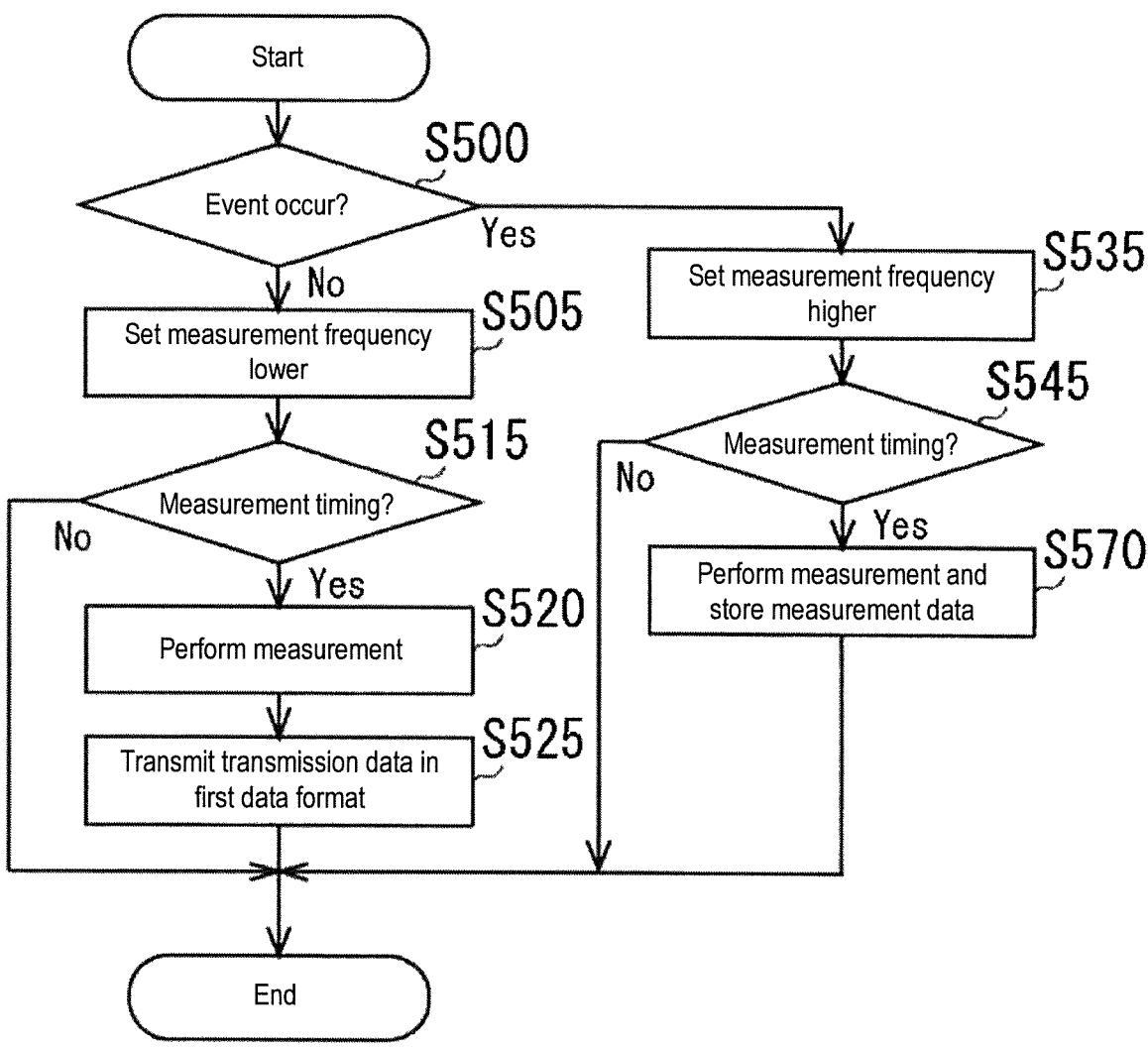
FIG. 22 is a flowchart illustrating a modification of the processing in which the composite sensor unit performs the measurement and transmits the measurement result in the embodiment (2-7).

The present invention is not limited to this configuration. The transmission data may be stored in the advertise packet and transmitted in the case where the event does not occur, and the connection to the reception-side device is established and transmission data may be stored in the data packet and transmitted in the case where the event occurs. FIG. 22 is a flowchart illustrating the processing when the connection to the reception-side device is established during the occurrence of the event.

In FIG. 22, the pieces of processing from step S500 to step S545 are identical to those in FIG. 21, so that the overlapping description will be omitted.

In FIG. 22, when the affirmative determination is made in step S545, each of the sensors 1A to 1Q performs the measurement, and the data acquisition unit 12 acquires the measurement data from each of the sensors 1A to 10, and stores the measurement data in the memory (step S570). On the other hand, when the negative determination is made in step S545, the composite sensor unit 1 ends the processing in FIG. 22. The composite sensor unit 1 repeatedly performs the processing in FIG. 22 until the power is turned off or until the instruction to stop the measurement is issued.

In this way, in the example of FIG. 22, in the case where the event occurs, the measurement data is stored in the memory, and the transmission data can be transmitted through the connection. In this case, in the case where the event occurs, in step S535, the reception-side device may be notified that the event occurs to encourage the reception-side device to establish the connection.

As described above, in the example of FIG. 22, the transmission data may be stored in the advertising packet and transmitted in the case where the event does not occur, and the connection to the reception-side device is established and transmission data may be stored in the data packet and transmitted through the connection in the case where the event occurs. Consequently, the transmission data is simply transmitted using the advertising packet in the case where the event does not occur, and the transmission data can surely be transmitted using the data packet in the case where the event occurs. In this way, by the simple transmission using the advertising packet, power consumption can be suppressed by omitting the connection processing. In the case where the event occurs, use of the data packet allows more data to be transmitted as compared to a case where the advertising packet is used, and enables encryption and error detection to conduct high-reliability communication.

A notification indicating that the event occurs may be made by transmitting iBeacon (registered trademark). For example, the notification indicating that the event occurs may be made by transmitting the advertise packet including a predetermined universally unique identifier (QUID). In this case, for example, the composite sensor unit 1 has service 0 (service holding the data such as the temperature, the humidity, and the illuminance), service 1 (service holding the data such as the SI value and the seismic intensity), and service 2 (service holding temperature data measured with high frequency). At this point, the service 1 holds the data relating to the earthquake, and the data is updated in each time of the occurrence of the event in which the earthquake occurs. The service 2 holds data that is validated at the time of the fire, and the data is updated in each time of the occurrence of the event in which the fire occurs.

On the other hand, in the user terminal 2 and the gateway 3, a correspondence relationship between the UUID indicating the service and the event is previously stored in the memory. For example, the UUID indicating the service 0 is transmitted by the advertise packet in the state in which the event does not occur. When the earthquake occurs, the sensor detects that an event has occurred, and the UUID indicating the service 1 is transmitted by the advertise packet. The user terminal 2 and the gateway 3 check the received advertise packet, determine that the UUID is changed, and learn that the event relating to the data of the service 1 (earthquake data service) occurs. Thus, the data relating to the service 1 can be acquired after the connection. Thus, by transmitting the service UUID corresponding to the event in the advertise packet, the user terminal 2 and the gateway 3 can recognize what kind of event occurs and which data should be acquired.

In the above example, when the event of the earthquake occurs, the data can be acquired even if access to the service 2 (temperature data service during the fire) is performed after the connection. At that time, since the event of the fire does not occur, the acquired data may be data in which the measurement (update) frequency is lower than the data acquired during the occurrence of the event of the fire (for example, the measurement data measured in step S520), or may be a null value when the update is not performed after the previous acquisition.

The composite sensor unit 1 may previously store the correspondence relationship between the UUID indicating each service and the event in the memory, and restrict the accessible service by changing the UUID transmitted in the advertise packet according to the event. For example, the composite sensor unit 1 transmits the UUID indicating the service 0 when determining that the event does not occur in step S500 of FIG. 22, and the composite sensor unit 1 transmits the UUID indicating the service 1 when determining that the earthquake occurs as the event. Such a restriction that the service except for the service 1 cannot be accessed is imposed inside the composite sensor unit 1. In the user terminal 2 and the gateway 3, the correspondence relationship between the UUID indicating each service and the event is previously stored in the memory, and the connection can be requested to conduct the data communication only of the service 1 in the case where the received advertise packet includes the UUID indicating the service 1. In this way, the user terminal 2 and the gateway 3 can recognize which data should be acquired.

For the embodiments (2-1) to (2-5), similarly to the example of FIG. 22, the transmission data may be stored in the advertising packet and transmitted in the case where the event does not occur, and the connection to the reception-side device is established and the transmission data may be stored in the data packet and transmitted through the connection in the case where the event occurs. For example, in the example of the embodiment (2-1), when the determination that the event occurs is made in step S30 of FIG. 7, the UUID corresponding to the event is transmitted, and the measurement result may be stored in the memory and transmitted to the user terminal 2 or the gateway 3 through the connection instead of steps S60 to S90. Similarly, in the example of the embodiment (2-2), when the determination that the event occurs is made in step S110 of FIG. 10, the UUID corresponding to the event may be transmitted, and the measurement result may be stored in the memory instead of steps S170 to S190. In the example of the embodiment (2-3), when the determination that the event occurs is made in step S200 of FIG. 12, the UUID corresponding to the event may be transmitted, and the measurement result may be stored in the memory instead of steps S250 to S260. In the example of the embodiment (2-4), when the determination that the malfunction occurs is made in step S330 of FIG. 14, the UUID corresponding to the malfunction may be transmitted, and the measurement result may be stored in the memory instead of steps S370 to S390. In the example of the embodiment (2-5), when the determination that the event occurs is made in step S410 of FIG. 16, the UUID corresponding to the event may be transmitted, and the measurement result may be stored in the memory instead of steps S445 to S460.

3. Form Example

A sensor device (1) according to an example of the present disclosure includes: a data acquisition unit (12) configured to acquire different types of measurement data from a plurality of sensors (1A to 1Q) that measure the measurement data; an event determination unit (13) configured to determine that an event occurs when the measurement data satisfies an event condition corresponding to the occurrence of the event; and a transmission controller (16) configured to transmit transmission data in which the measurement data is stored in a predetermined data format, wherein the transmission controller (16) varies the data format of the transmission data in a case where the event does not occur and in a case where the event occurs.

The above embodiments and modifications of the present invention are merely examples, and the present invention is not limited thereto. The characteristic configurations described in the embodiments and the modifications can naturally be combined without departing from the scope of the present invention. For example, in the above embodiments, the identification signal is not limited to the Bluetooth advertise packet, but may be a beacon in the Bluetooth standard before Bluetooth 4.0 or a WiFi beacon.

The invention claimed is:
1. A sensor device comprising:
  a data acquisition unit configured to acquire different types of measurement data from a plurality of sensors that measure the measurement data;

an event determination unit configured to determine that an event occurs when the measurement data satisfies an event condition corresponding to the occurrence of the event; and a transmission controller configured to transmit transmission data in which the measurement data is stored in a predetermined data format, wherein the transmission controller varies the data format of the transmission data in a case where the event does not occur and in a case where the event occurs, and wherein the transmission controller transmits the transmission data in a first data format including the measurement data of a predetermined type when the event does not occur, and the transmission controller transmits the transmission data in a second data format including the measurement data of a type different from the first data format and the transmission data in the first data format in a time division manner when the event occurs.

2. The sensor device according to claim 1, wherein the transmission controller transmits the transmission data with the transmission data stored in an identification signal for detecting the sensor device.

3. The sensor device according to claim 1, wherein when the event occurs, the transmission controller transmits the transmission data in a data format including the measurement data of a type corresponding to the event.

4. The sensor device according to claim 1, wherein the transmission controller transmits the transmission data in a first data format including the measurement data of a predetermined type and the transmission data in a second data format including the measurement data of a type different from the first data format in a time division manner, and varies at least a transmission frequency of the transmission data in the second data format in the case where the event does not occur in the case where the event occurs.

5. The sensor device according to claim 1, further comprising:

an operation setting unit configured to set a measurement frequency of each of the sensors when the event occurs higher than a measurement frequency when the event does not occur, wherein the transmission data is transmitted in a data format including a plurality of pieces of the measurement data measured at measurement timing set by the operation setting unit when the event occurs.

6. The sensor device according to claim 1, wherein when the event determination unit determines that an occurrence of a malfunction of the sensor device is the occurrence of the event, the transmission controller transmits the transmission data in a data format including the measurement data and the transmission data in a data format including data indicating the malfunction in a time division manner.

7. The sensor device according to claim 1, wherein a plurality of types of measurement data measured by the plurality of sensors are distributed to a predetermined number of data formats, and the pieces of transmission data in the predetermined number of data formats are periodically transmitted.

8. The sensor device according to claim 1, further comprising:

a storage in which the measurement data measured by the sensor is stored, wherein a plurality of pieces of measurement data measured at different timings are read from the storage, and the transmission data in a data format including the plurality of pieces of measurement data is transmitted.

9. The sensor device according to claim 1, further comprising:

an operation setting unit configured to set a measurement frequency of the sensor when the event occurs higher than a measurement frequency when the event does not occur; and a storage in which the measurement data measured by the sensor is stored, wherein the data acquisition unit stores the measurement data in the storage when the event occurs, and when a transmission request is received from another device, the transmission controller reads the plurality of pieces of measurement data from the storage and transmits the transmission data in a data format including the measurement data to the other device.

10. The sensor device according to claim 2, wherein the identification signal is an advertise packet or a beacon packet used in Bluetooth (registered trademark).

11. The sensor device according to claim 1, further comprising:

a connection controller configured to establish connection to another device when the event occurs, wherein the transmission controller transmits the transmission data with the transmission data stored in the identification signal when the event does not occur, and the transmission controller transmits the transmission data to the other device through the connection established by the connection controller when the event occurs.

12. The sensor device according to claim 11, wherein when the event occurs, a universally unique identifier (UUID) corresponding to the event is stored in an advertise packet used in Bluetooth, and the advertise packet is transmitted to cause the other device to make a connection request.

13. The sensor device according to claim 2, wherein when the event occurs, the transmission controller transmits the transmission data in a data format including the measurement data of a type corresponding to the event.

14. The sensor device according to claim 2, wherein the transmission controller transmits the transmission data in a first data format including the measurement data of a predetermined type when the event does not occur, and the transmission controller transmits the transmission data in a second data format including the measurement data of a type different from the first data format and the transmission data in the first data format in a time division manner when the event occurs.

15. The sensor device according to claim 3, wherein the transmission controller transmits the transmission data in a first data format including the measurement data of a predetermined type when the event does not occur, and the transmission controller transmits the transmission data in a second data format including the measurement data of a type different from the first data format and the transmission data in the first data format in a time division manner when the event occurs.

16. The sensor device according to claim 2, wherein the transmission controller transmits the transmission data in a first data format including the measurement data of a predetermined type and the transmission data in a second data format including the measurement data of a type different from the first data format in a time division manner, and varies at least a transmission frequency of the transmission data in the second data format in the case where the event does not occur in the case where the event occurs.

17. The sensor device according to claim 3, wherein the transmission controller transmits the transmission data in a first data format including the measurement data of a predetermined type and the transmission data in a second data format including the measurement data of a type different from the first data format in a time division manner, and varies at least a transmission frequency of the transmission data in the second data format in the case where the event does not occur in the case where the event occurs.

18. The sensor device according to claim 2, further comprising:
   an operation setting unit configured to set a measurement frequency of each of the sensors when the event occurs higher than a measurement frequency when the event does not occur,
   wherein the transmission data is transmitted in a data format including a plurality of pieces of the measurement data measured at measurement timing set by the operation setting unit when the event occurs.

19. The sensor device according to claim 3, further comprising:
   an operation setting unit configured to set a measurement frequency of each of the sensors when the event occurs higher than a measurement frequency when the event does not occur,
   wherein the transmission data is transmitted in a data format including a plurality of pieces of the measurement data measured at measurement timing set by the operation setting unit when the event occurs.

* * * * *